United States Patent
Shiraga et al.

(10) Patent No.: US 9,921,787 B2
(45) Date of Patent: Mar. 20, 2018

(54) RELAY APPARATUS AND COMMUNICATION SYSTEM

(71) Applicant: BROTHER KOGYO KABUSHIKI KAISHA, Nagoya-shi, Aichi-ken (JP)

(72) Inventors: Naoto Shiraga, Nagoya (JP); Takao Yasuda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 41 days.

(21) Appl. No.: 15/221,754

(22) Filed: Jul. 28, 2016

(65) Prior Publication Data
US 2017/0060496 A1    Mar. 2, 2017

(30) Foreign Application Priority Data
Aug. 27, 2015    (JP) .................................. 2015-167452

(51) Int. Cl.
G06F 3/12        (2006.01)
G06F 21/60      (2013.01)

(52) U.S. Cl.
CPC .......... *G06F 3/1222* (2013.01); *G06F 3/1238* (2013.01); *G06F 3/1286* (2013.01); *G06F 3/1288* (2013.01); *G06F 3/1292* (2013.01); *G06F 21/608* (2013.01)

(58) Field of Classification Search
None
See application file for complete search history.

(56) References Cited

U.S. PATENT DOCUMENTS

| | | | | |
|---|---|---|---|---|
| 8,797,580 B2 * | 8/2014 | Armstrong | ............ | G06F 3/1222 358/1.14 |
| 9,521,144 B2 * | 12/2016 | Matsugashita | ...... | H04L 63/0884 |
| 9,626,137 B2 * | 4/2017 | Mihara | ................. | G06F 3/1222 |
| 2015/0205547 A1 * | 7/2015 | Shiraga | ................. | G06F 3/1222 358/1.14 |
| 2015/0277821 A1 * | 10/2015 | Mori | ..................... | G06F 3/1236 358/1.15 |

FOREIGN PATENT DOCUMENTS

JP        2008-229993 A      10/2008

* cited by examiner

*Primary Examiner* — Paul F Payer
(74) *Attorney, Agent, or Firm* — Scully, Scott, Murphy & Presser, PC

(57) ABSTRACT

A relay apparatus executes: a first receiving process of receiving service requesting information and first identification information from an image forming apparatus through a communicator, the service requesting information being information requesting a service provided by the service providing apparatus; a first read-out process of reading out, from the memory, the first authentication information identified by the first identification information; a first transmitting process of transmitting, to the service providing apparatus through the communicator, the service requesting information and the first authentication information; a second receiving process of receiving service information corresponding to the service requesting information from the service providing apparatus through the communicator, the service information being information provided by the service providing apparatus in response to the service requesting information; and a second transmitting process of transmitting the service information to the image forming apparatus through the communicator.

20 Claims, 13 Drawing Sheets

| TempID | R TOKEN ID | R TOKEN | SIZE INFORMATION | A TOKEN ID | A TOKEN |
|---|---|---|---|---|---|
| 012 | — | 0x18A3 | 128 | ABC | 0x2C6EB |
| ... | ... | ... | ... | ... | ... |

RELAY APPARATUS AND COMMUNICATION SYSTEM

CROSS REFERENCE TO RELATED APPLICATIONS

This application claims priority from Japanese Patent Application No. 2015-167452 filed Aug. 27, 2015. The entire content of the priority application is incorporated herein by reference.

TECHNICAL FIELD

This disclosure relates to a communication system configured to perform data communication between an image forming apparatus and a service providing apparatus.

BACKGROUND

An image forming apparatus configured to receive a service provided by a service providing apparatus on Internet is conventionally known. The service provided by the service providing apparatus includes, for example, a service of storing data uploaded by an image forming apparatus in the service providing apparatus, a service of downloading data stored in the service providing apparatus to the image forming apparatus, and so on. For example, a known image forming apparatus transmits authentication information to a Web server for receiving authentication, and receives content data from the Web server.

SUMMARY

According to one aspect, this specification discloses a relay apparatus. The relay apparatus includes a communicator, a processor, and a memory. The communicator is configured to perform communication with an image forming apparatus configured to perform an image forming operation and with a service providing apparatus configured to provide the image forming apparatus with a service. The memory is configured to store first authentication information and first identification information identifying the first authentication information. The first authentication information is issued by the service providing apparatus for indicating authority to receive a service provided by the service providing apparatus. The first identification information has a smaller data size than the first authentication information corresponding to the first identification information. The memory stores instructions, the instructions, when executed by the processor, causing the relay apparatus to execute: a first receiving process of receiving service requesting information and the first identification information from the image forming apparatus through the communicator, the service requesting information being information requesting a service provided by the service providing apparatus; a first read-out process of reading out, from the memory, the first authentication information identified by the first identification information received by the first receiving process; a first transmitting process of transmitting, to the service providing apparatus through the communicator, the service requesting information received by the first receiving process and the first authentication information read out by the first read-out process; a second receiving process of receiving service information corresponding to the service requesting information from the service providing apparatus through the communicator, the service information being information provided by the service providing apparatus in response to the service requesting information; and a second transmitting process of transmitting the service information received by the second receiving process to the image forming apparatus through the communicator.

According to another aspect, this specification also discloses a communication system including a relay apparatus and an image forming apparatus. The relay apparatus includes a first communicator, a server processor, and a first memory. The first communicator is configured to perform communication with the image forming apparatus and a service providing apparatus. The first memory is configured to store first authentication information and first identification information identifying the first authentication information. The first authentication information is issued by the service providing apparatus for indicating authority to receive a service provided by the service providing apparatus. The first identification information has a smaller data size than the first authentication information corresponding to the first identification information. The first memory stores instructions, the instructions, when executed by the processor, causing the relay apparatus to execute: a first receiving process of receiving service requesting information and the first identification information from the image forming apparatus through the first communicator, the service requesting information being information requesting a service provided by the service providing apparatus; a first read-out process of reading out, from the first memory, the first authentication information identified by the first identification information received by the first receiving process; a first transmitting process of transmitting, to the service providing apparatus through the first communicator, the service requesting information received by the first receiving process and the first authentication information read out by the first read-out process; a second receiving process of receiving service information corresponding to the service requesting information from the service providing apparatus through the first communicator, the service information being information provided by the service providing apparatus in response to the service requesting information; and a second transmitting process of transmitting the service information received by the second receiving process to the image forming apparatus through the first communicator. The image forming apparatus includes an image forming device, an apparatus communicator, an apparatus processor, and an apparatus memory. The image forming device is configured to form an image. The apparatus communicator is configured to perform communication with the relay apparatus. The apparatus memory stores instructions, the instructions, when executed by the apparatus processor, causing the image forming apparatus to: transmit the service requesting information and the first identification information to the relay apparatus through the apparatus communicator; and receive the service information from the relay apparatus through the apparatus communicator.

BRIEF DESCRIPTION OF THE DRAWINGS

Embodiments in accordance with this disclosure will be described in detail with reference to the following figures wherein:

FIGS. 12A and 12B show display examples of a display 53, wherein FIG. 12A shows a login screen and FIG. 12B shows a TempID display screen; and FIGS. 13A and 13B show display examples of a display 23, wherein FIG. 13A shows a TempID input screen and FIG. 13B shows a data selecting screen.

DETAILED DESCRIPTION

In recent years, the data size of authentication information tends to increase due to high-level security and complication of processes. On the other hand, not many image forming apparatuses have a memory of large storage capacity, but need a large storage area for storing image data to be processed. This leads to an issue that it is difficult to secure a large storage area for storing authentication information in image forming apparatuses.

In view of the foregoing, an example of the object of this disclosure is to provide a relay apparatus that enables an image forming apparatus to receive a service that requires authentication information of a large data size.

Some aspects of this disclosure will be described while referring to the accompanying drawings.

Figure 1:
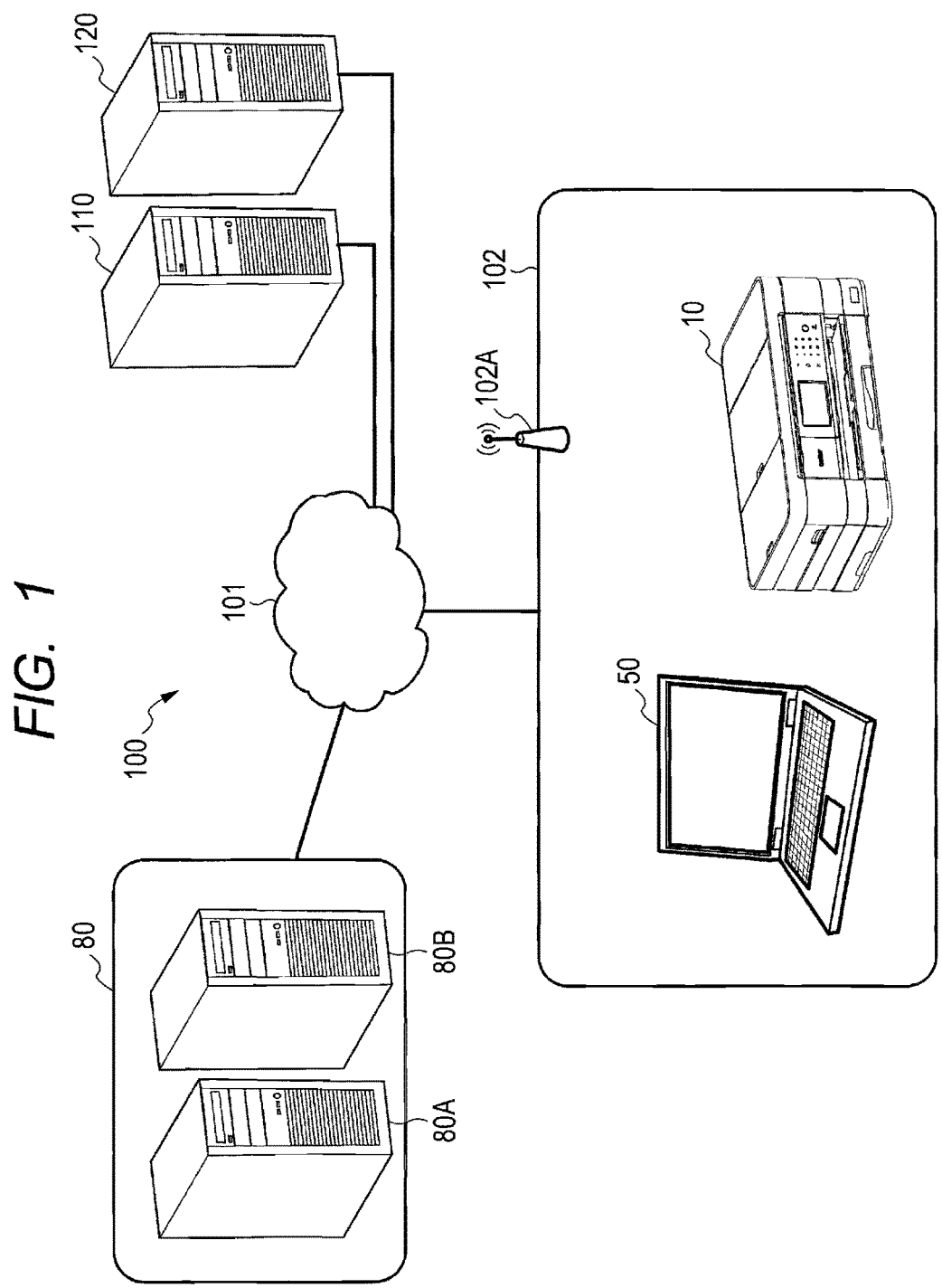
FIG. 1 is a schematic diagram showing a communication system 100 according to an embodiment.

A communication system 100 shown in FIG. 1 includes a multifunction peripheral (MFP) 10, an information processing terminal 50, and a relay apparatus 80. The communication system 100 is a system for receiving a service provided by a service providing apparatuses 110, 120. The MFP 10, the information processing terminal 50, the relay apparatus 80, and the service providing apparatuses 110, 120 are configured to perform communication with one another through a communication network. The communication network is not limited to a specific example, but may be Internet 101, a wired LAN (Local Area Network), a wireless LAN 102, or a combination thereof, for example.

The MFP 10 and the information processing terminal 50 belong to the wireless LAN 102. The wireless LAN 102 is connected to the Internet 101 through a router 102A. Further, the relay apparatus 80 and the service providing apparatuses 110, 120 are connected to the Internet 101. The MFP 10 and the information processing terminal 50 perform communication with the relay apparatus 80 and the service providing apparatuses 110, 120 through the router 102A and the Internet 101. Note that the MFP 10 and the information processing terminal 50 may belong to different communication networks.

MFP 10

Figure 2A:
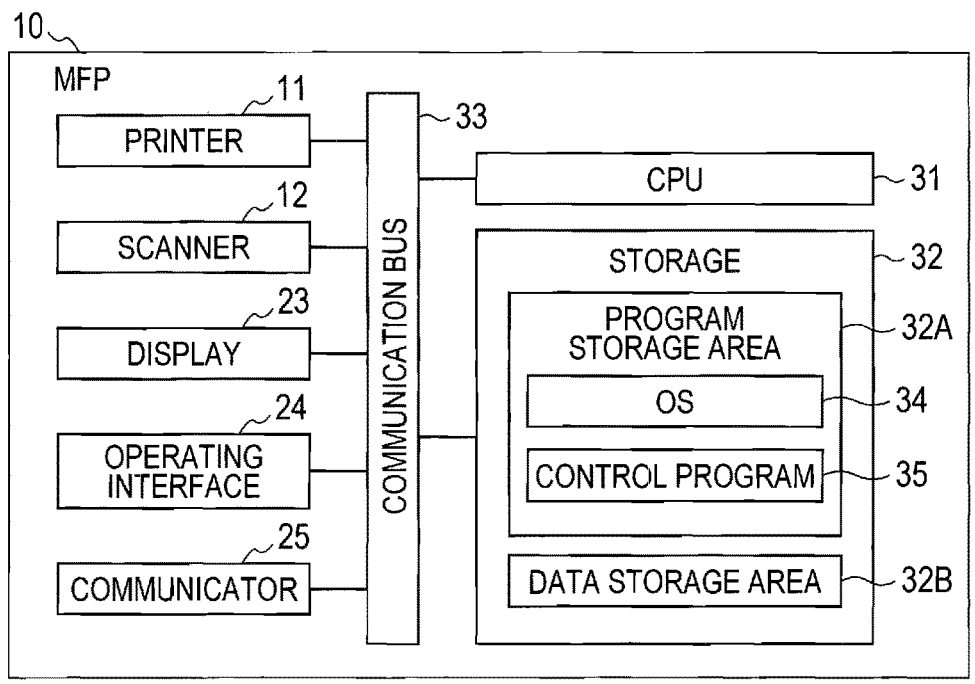
FIG. 2A is a block diagram of a multifunction peripheral (MFP) 10.

As shown in FIG. 2A, the MFP 10 mainly includes a printer 11, a scanner 12, a display 23, an operating interface 24, a communicator 25, a CPU 31, a storage 32, and a communication bus 33. The elements constituting the MFP 10 are connected to one another through the communication bus 33. The MFP 10 is an example of an image forming apparatus. The printer 11 and the scanner 12 are an example of an image forming device that forms an image. The communicator 25 is an example of a second communicator.

Printer 11, Scanner 12

The printer 11 performs a recording operation of recording an image represented by image data on recording paper. The recording paper is an example of a sheet or a recording medium. As a recording method of the printer 11, a known method may be adopted such as an inkjet method or an electro-photographic method. The scanner 12 performs a scan operation of reading an image recorded on an original document and generating image data. The printer 11 is an example of a recorder, and the scanner 12 is an example of a reader. The MFP 10 may further perform a FAX operation of performing transmission and reception of FAX, a copy operation of reading an image recorded on recording paper and recording the image on another recording paper, and so on.

Display 23

The display 23 includes a display screen that displays various kinds of information. As the display 23, a liquid crystal display, an organic electro-luminescence (EL) display, and so on may be adopted.

Operating Interface 24

The operating interface 24 receives a user operation of selecting an object that is displayed on the display screen of the display 23. Specifically, the operating interface 24 has buttons, and outputs various operation signals associated with pressed buttons to the CPU 31. The operating interface 24 may further have a film-like touch sensor that is layered on the display screen of the display 23. That is, the display 23 may be a touch panel display.

Here, the term "object" denotes an image that can be selected by user's operation on the operating interface 24. As one example, objects may be character strings displayed on the display 23, and one of the objects may be highlighted by pressing a cursor key of the operating interface 24, and the highlighted object may be selected by pressing the enter button of the operating interface 24. As another example, objects in a case where the operating interface 24 is a touch panel may be icons, buttons, links, and so on, displayed on the display 23, and the object displayed at a touched position may be selected.

The operating interface 24 realized as a touch panel receives a user operation of touching the display screen of the display 23. The operating interface 24 outputs positional information indicative of the position on the display screen that is touched by the user. For example, the positional information is represented by a coordinate (x, y) on an x-y plane where the left upper end of the display screen is the origin, the rightward direction is the positive direction of the x-axis, and the downward direction is the positive direction of the y-axis. As a touch sensor, a known type such as a capacitance type and a resistive type may be adopted.

The term "touch" in this specification includes all operations that an input medium touches the display screen. That is, the examples of touch operations include a tap operation of separating a touched input medium from the display screen in a particular period, a long touch operation of making the touched input medium still on the display screen, a slide operation of sliding the touched input medium on the display screen, a flick operation of sliding the touched input medium on the display screen at acceleration higher than or equal to a threshold, a pinch-in operation of sliding two input mediums touching at different positions on the display screen in directions approaching each other, a pinch-out operation of sliding two input mediums touching at different positions on the display screen in directions separating from each other, and so on.

The above-mentioned "touch" may also include that an input medium is moved to a position that is very close to the display screen although the input medium is not touching the display screen. Further, the input medium may be a finger of a user, or may be a touch pen, or the like. Hereinafter, descriptions will be provided by taking a tap on the position of an icon displayed on the display 23 as an example of the user operation of selecting the icon.

Communicator 25

The communicator 25 is an interface for performing communication with an external apparatus. Specifically, the communicator 25 performs communication with the information processing terminal 50, the relay apparatus 80, and the service providing apparatuses 110, 120. The communicator 25 performs communication in a procedure compatible with the IEEE802.11 standard, Wi-Fi™ (Trademark of Wi-Fi Alliance), for example.

CPU 31

The CPU (Central Processing Unit) 31 controls the entire operation of the MFP 10. The CPU 31 acquires and executes various programs described later from the storage 32, based on various information outputted from the operating interface 24 and on various information and so on acquired from an external apparatus through the communicator 25. That is, the CPU 31 and the storage 32 constitute an example of an apparatus processor.

Storage 32

The storage 32 has a program storage area 32A and a data storage area 32B. The program storage area 32A stores an OS (Operating System) 34 and a control program 35. The OS 34 and the control program 35 are programs built in a binary format. The control program 35 may be a single program, or may be a combination of a plurality of programs. The data storage area 32B stores data or information needed for executing the control program 35. The storage 32 is an example of an apparatus memory.

Here, both of "data" and "information" in this specification are a bit or a bit array that can be handled by a computer. The "data" is one that can be handled by a computer without considering the meaning of each bit. In contrast, the "information" is one that the operation of the computer branches depending on the meaning of each bit. Further, "instruction" is a control signal for prompting a transmission-destination apparatus to perform the next operation. The "instruction" sometimes includes information, and the "instruction" itself sometimes has a property of information.

Even if the format (for example, text format, binary format, flag format, and so on) is changed depending on each computer, "data" and "information" are treated as the same data and information as long as it has the same meaning. For example, information indicative of "two" may be kept as text format information "0x32" in ASCII code in a certain computer, and may be kept as binary format information "10" in another computer.

However, the above-described definitions of the "data" and "information" are not strict one, and there are also exceptions. For example, data may be temporarily treated as information, and information may be temporarily treated as data. Further, one treated as data in a certain apparatus may be treated as information in another apparatus. Further, information may be taken out of data, and data may be taken out of information.

The storage 32 includes, for example, a RAM (Random Access Memory), a ROM (Read Only Memory), an EEPROM (Electrically Erasable Programmable Read-Only Memory), a HDD (Hard Disk Drive), a buffer provided in the CPU 31, and so on, or a combination thereof.

The storage 32 may be a computer-readable storage medium. The computer-readable storage medium is a non-transitory medium. The non-transitory medium also includes recording mediums such as a CD-ROM and a DVD-ROM, in addition to the above-described examples. The non-transitory medium is a tangible medium. On the other hand, an electric signal conveying a program downloaded from a server or the like on the Internet is a computer-readable signal medium that is a kind of a computer-readable medium, but is not included in the non-transitory computer-readable storage medium.

The CPU 31 executes programs stored in the program storage area 32A. In this specification, however, operations of each program are sometimes described while omitting the CPU 31. That is, in the following description, a sentence "a program A executes a process A" may mean that "the CPU 31 executes the process A described in the program A".

The program stored in the program storage area 32A determines an event and operates depending on the determination result. In this specification, however, operations of each program are sometimes described while omitting such determination. That is, in the following description, a sentence "a control program executes a process A depending on a condition A" may mean that "The control program determines whether a condition A is satisfied. The control program executes the process A in response to a positive determination".

The program stored in the program storage area 32A identifies, extracts, or selects data and so on. The phrase "program identifies data and so on" indicates, for example, a process of identifying data matching a condition from among a plurality of data and so on and of storing, in a predetermined storage area, the data and so on itself or information identifying the data and so on. The information identifying data and so on includes, for example, identification information identifying the data and so on, an index of an array in which the data and so on are stored, a pointer of a storage area in which the data and so on are stored, and so on. The same goes for a process that a program extracts or selects data and so on.

The program stored in the program storage area 32A acquires data and so on. The phrase "program acquires data and so on" may indicate, for example, a process of reading out data from a storage area in which the data is stored. The phrase "program acquires data and so on" may indicate, for example, a process of receiving data transmitted from an external apparatus. The phrase "program acquires data and so on" may indicate, for example, a process of requesting an external apparatus to return data and of receiving the data returned from the external apparatus. The phrase "program acquires data and so on" may indicate, for example, a process of receiving data outputted from another program such as the OS. The phrase "program acquires data and so on" may indicate, for example, a process of requesting another program to output data and of receiving the data outputted from the other program.

The OS 34 is a basic program that provides API (Application Programming Interface) for controlling the printer 11, the scanner 12, the display 23, the operating interface 24, the communicator 25, and so on, that are hardware elements constituting the MFP 10. That is, the above-described each program controls each hardware element by calling the API provided by the OS 34. In this specification, however, the operations of each program may be described while omitting the OS 34. That is, in the following description, the phrase "program B controls hardware C" may mean that "program B controls hardware C through the API of the OS 34".

The descriptions of basic operations of the above-mentioned program may be similarly applied not only to the program stored in the program storage area 32A but also to each program stored in program storage areas 62A, 92A of the information processing terminal 50 and the relay apparatus described later.

Information Processing Terminal 50

Figure 2B:
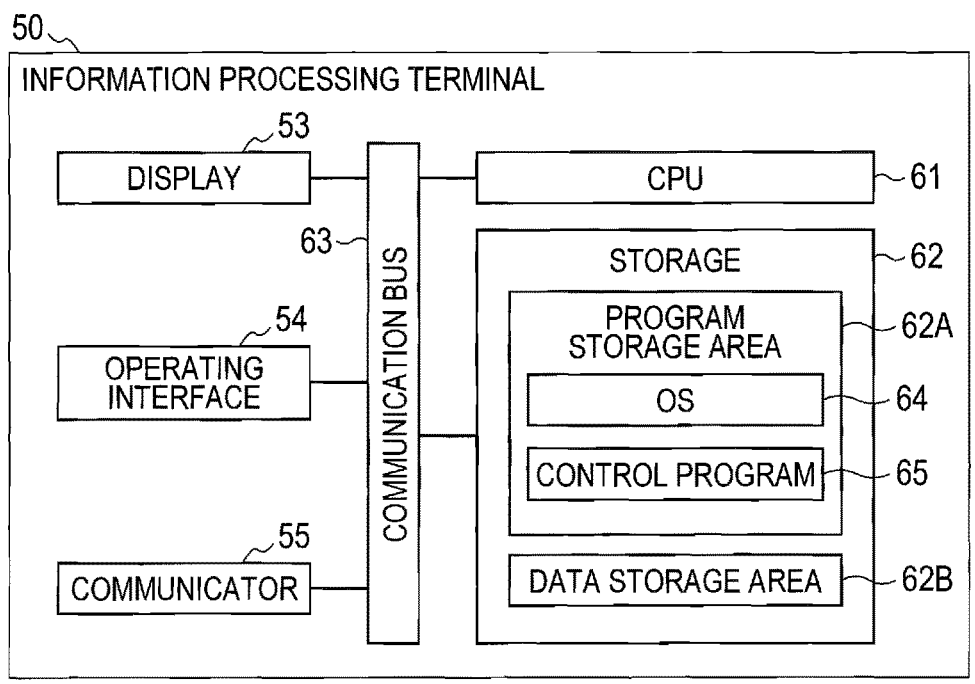
FIG. 2B is a block diagram of an information processing terminal 50.

As shown in FIG. 2B, the information processing terminal 50 mainly includes a display 53, an operating interface 54, a communicator 55, a CPU 61, a storage 62, and a communication bus 63. The CPU 61 and the storage 62 constitute an example of a terminal processor. The display 53, the operating interface 54, the communicator 55, the CPU 61, the storage 62, and the communication bus 63 included in the information processing terminal 50 are basically the same as the display 23, the operating interface 24, the communicator 25, the CPU 31, the storage 32, and the communication bus 33 included in the MFP 10, and hence descriptions for these elements are not repeated. The storage 62 has the program storage area 62A and a data storage area 62B. The program storage area 62A stores an OS 64 and a control program 65. The information processing terminal 50 may be a mobile phone, a smartphone, a tablet device, or a PC (Personal Computer), for example. The control program 65 is a browser program, for example.

Relay Apparatus 80

Figures 3A, 3B:
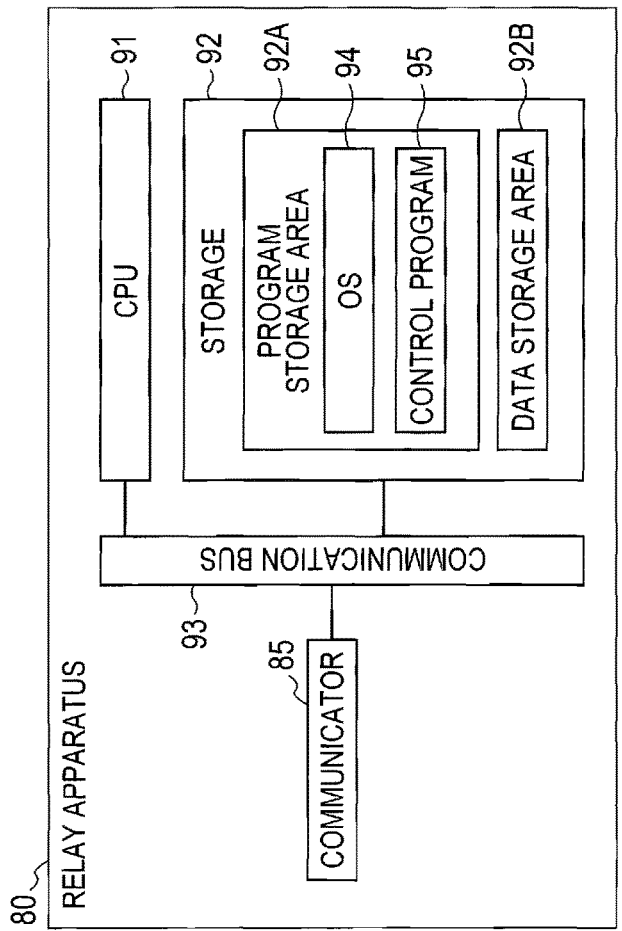
FIG. 3A is a block diagram of a relay apparatus 80.
FIG. 3B shows one example of a token list.
Figure 4:
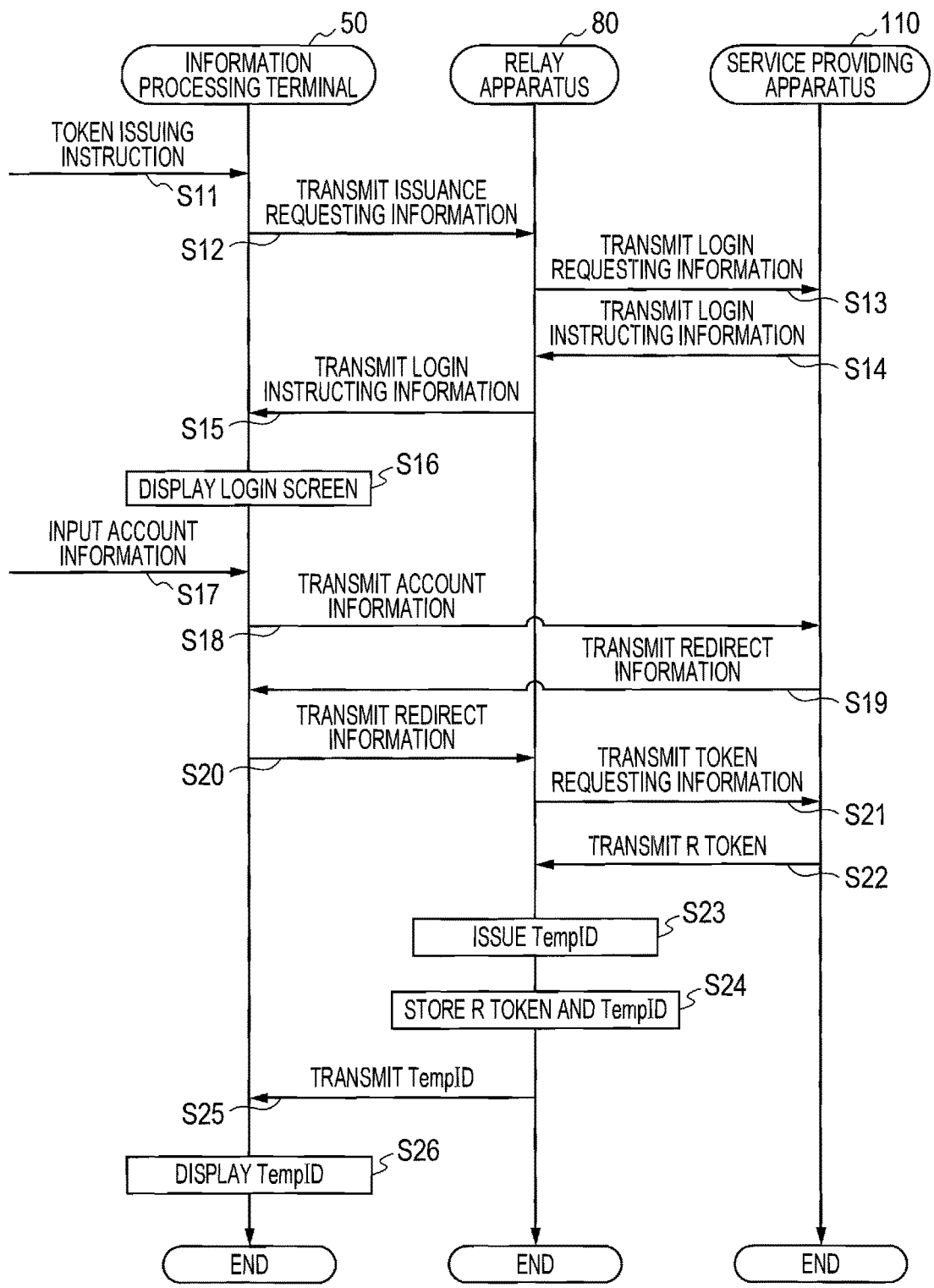
FIG. 4 is a flowchart showing a process of causing a service providing apparatus 110 to issue an R token through the information processing terminal 50.

As shown in FIG. 3A, the relay apparatus 80 mainly includes a communicator 85, a CPU 91, a storage 92, and a communication bus 93. The CPU 91 and the storage 92 constitute an example of a server processor. The communicator 85 is an example of a first communicator. The communicator 85, the CPU 91, the storage 92, and the communication bus 93 included in the relay apparatus 80 are basically the same as the communicator 25, the CPU 31, the storage 32, and the communication bus 33 included in the MFP 10, and hence descriptions for these elements are not repeated. The storage 92 has the program storage area 92A and a data storage area 92B. The program storage area 92A stores an OS 94 and a control program 95.

As shown in FIG. 1, the relay apparatus 80 may be realized by a first apparatus 80A and a second apparatus 80B, for example. The configurations of the first apparatus 80A and the second apparatus 80B are the same as the configuration of the relay apparatus 80 shown in FIG. 3A. The first apparatus 80A and the second apparatus 80B divide the processes to be executed by the relay apparatus 80. The processes executed by the first apparatus 80A and the second apparatus 80B will be described later in detail. However, a specific configuration of the relay apparatus 80 is not limited to this. That is, the relay apparatus 80 may be a single apparatus, or may further include a third apparatus (not shown).

As shown in FIG. 3B, for example, a data storage area 92B is configured to store a TempID, an R token ID, a refresh token (hereinafter referred to as "R token"), size information, an A token ID, and an access token (hereinafter referred to as "A token") in association with one another. Hereinafter, information shown in FIG. 3B is sometimes collectively referred to as "token list", and each record shown in FIG. 3B is sometimes referred to as "token record". The token list may include a plurality of token records.

The A token is an example of first authentication information that is issued by the service providing apparatus 110, 120 that provides a service for indicating authority to receive the service. The R token is an example of second authentication information that is issued by the service providing apparatus 110, 120 for indicating authority to acquire the corresponding A token. The A token ID is an example of first identification information that is issued by the relay apparatus 80 for uniquely identifying the corresponding A token. The R token ID is an example of second identification information that is issued by the relay apparatus 80 for uniquely identifying the corresponding R token. The TempID is an example of temporary identification information that is issued by the relay apparatus 80 in association with the R token.

The TempID is an array of numbers or characters that can be recognized by a user of the information processing terminal 50, for example. The A token and R token are binary data, for example. The A token ID has a smaller data size than the corresponding A token. The R token ID has a smaller data size than the corresponding R token. In the present embodiment, the A token has a data size of 256 byte, the R token has a data size of 128 byte, and each of the A token ID and the R token ID has a data size of 6 byte. The data size of the A token and the R token may differ depending on the service providing apparatus 110, 120 that issues the token, or on a corresponding service.

The size information indicates the maximum size of the A token or R token that can be stored in the MFP 10. In the present embodiment, each maximum size of the A token and R token that can be stored in the MFP 10 is 128 byte. However, the maximum size of the A token and the maximum size of the R token that can be stored may be different.

Linkage Operation of MFP 10 and Relay Apparatus 80

The MFP 10 and the relay apparatus 80 perform a linkage operation. The linkage operation is an operation that the relay apparatus 80 instructs (transmits instruction information to) the MFP 10 to perform an operation, the MFP 10 performs the operation instructed by the relay apparatus 80, the MFP 10 reports the result of this operation to the relay apparatus 80, and the relay apparatus 80 instructs (transmits another instruction information to) the MFP 10 to perform the next operation based on this report. In the linkage operation, information from the MFP 10 to the relay apparatus 80 is transmitted as a HTTP (HyperText Transfer Protocol) request, and information from the relay apparatus 80 to the MFP 10 is transmitted as a HTTP response.

The instruction information transmitted from the relay apparatus 80 to the MFP 10 is described in an XML (eXtensible Markup Language), for example. This instruction information includes, for example, screen definition information for defining a screen displayed on the display 23, interface information for identifying an interface to acquire information (for example, the operating interface 24, the communicator 25, and so on), and a next operation URL for identifying the request destination of the next operation. The instruction information may further include service usage information added to the HTTP request that requests this instruction information.

The MFP 10 having received this instruction information displays a screen defined by the screen definition information on the display 23, acquires information through the interface identified by the interface information, and transmits a HTTP request for requesting transmission of the next instruction information indicated by the next operation URL. When transmitting this HTTP request, the MFP 10 transmits, to the relay apparatus 80, the service usage information acquired in a series of linkage operations by a GET method. That is, the URL analyzed by the MFP 10 is such that service usage information is added to the end of the next operation URL.

Service Providing Apparatus 110, 120

The service providing apparatuses 110, 120 are apparatuses that provide the MFP 10 with a service. The service providing apparatuses 110, 120 exist on the Internet, and provide various services in response to requests from the MFP 10, the information processing terminal 50, or the relay apparatus 80. For example, the service providing apparatuses 110, 120 of the present embodiment may provide a service of managing a state of the MFP 10, a service of storing uploaded data, a service of transmitting stored data in response to a download request, a service of converting the format of data, and so on.

For example, the service providing apparatuses 110, 120 are apparatuses that provide services such as Evernote (trademark of Evernote Corporation), Dropbox (trademark of DropBox, Inc.), Google Drive (Google is trademark of Google, Inc.), SharePoint (trademark of Microsoft Corporation), and OneDrive for Business (OneDrive is trademark of Microsoft Corporation).

Operation of Communication System 100

The operations of the communication system 100 according to the present embodiment will be described while referring to FIGS. 4 to 8. In the present embodiment, descriptions will be provided mainly for processes of the relay apparatus 80 for allowing the MFP 10 to receive a service provided by the service providing apparatus 110.

First, the control program 65 of the information processing terminal 50 receives a token issuing instruction from a user through the operating interface 54 (S11) ("Step" is abbreviated as "S"). Next, the information processing terminal 50 transmits issuance requesting information to the relay apparatus 80 through the communicator 55 (S12). The token issuing instruction is a user operation of instructing execution of a process for causing the service providing apparatus 110 to issue an R token. The issuance requesting information is information for requesting issuance of an R token by the service providing apparatus 110. For example, the issuance requesting information includes a server ID that identifies the service providing apparatus 110 of the issuing source of the R token, and a service ID that identifies a service to receive. Hereinafter, the service ID included in the issuance requesting information is referred to as "target service ID", and the service identified by the target service ID is referred to as "target service".

Next, the control program 95 of the relay apparatus 80 receives the issuance requesting information from the information processing terminal 50 through the communicator 85 (S12). Next, the control program 95 transmits login requesting information to the service providing apparatus 110 through the communicator 85 (S13). The login requesting information is information for requesting transmission of an access URL (Uniform Resource Locator). The login requesting information includes a target service ID, for example. The access URL is information indicative of the transmission destination of account information that the information processing terminal 50 has acquired from the user.

Next, the service providing apparatus 110 receives login requesting information from the relay apparatus 80 (S13). The service providing apparatus 110 then generates an access URL corresponding to the target service ID included in the login requesting information, and transmits login instructing information including this access URL to the relay apparatus 80 (S14). For example, the login instructing information is an HTML (HyperText Markup Language) including the issued access URL and defining a login screen described later.

Next, the control program 95 of the relay apparatus 80 receives the login instructing information from the service providing apparatus 110 through the communicator 85 (S14). The control program 95 then transmits the login instructing information to the information processing terminal 50 through the communicator 85 (S15). In S15, for example, the control program 95 adds a redirect URL indicative of the transmission destination of redirect information to the login instructing information received from the service providing apparatus 110 in S14, and transmits this information to the information processing terminal 50.

Figure 12A:
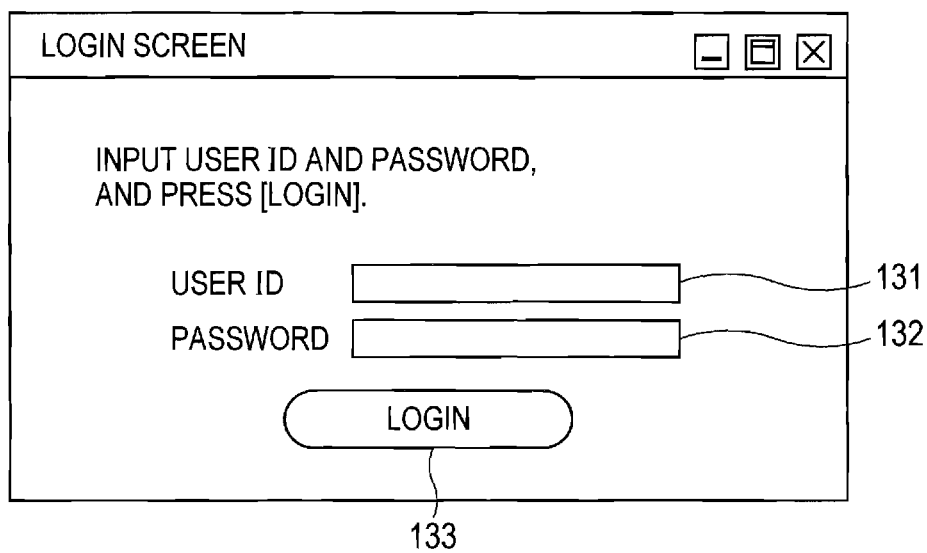

Next, the control program 65 of the information processing terminal 50 receives the login instructing information from the relay apparatus 80 through the communicator 55 (S15). The control program 65 then displays a login screen on the display 53 in accordance with the login instructing information (S16). FIG. 12A is an example of the login screen. The login screen shown in FIG. 12A includes a message that "Input user ID and password and press [Login], a text box 131 that displays the user ID inputted through the operating interface 54, a text box 132 that displays the password inputted through the operating interface 54, and a [Login] icon 133. Then, the control program 65 receives a user operation on the login screen through the operating interface 54 (S17).

Next, the control program 65 receives input of user ID and password through the operating interface 54. The user ID and the password are preliminarily issued by the service providing apparatus 110 for allowing the user to use the target service. The combination of the user ID and the password is an example of account information. In response to receiving selection of the [Login] icon 133 through the operating interface 54 (S17), the control program 65 transmits the inputted account information to the service providing apparatus 110 indicated by the access URL through the communicator 55 (S18).

Next, the service providing apparatus 110 receives the account information from the information processing terminal 50 (S18). Next, the service providing apparatus 110 determines whether the received account information is valid. In response to determining that the account information is valid, the service providing apparatus 110 transmits redirect information to the information processing terminal 50 (S19). The redirect information is information for allowing the relay apparatus 80 to acquire the R token of the target service issued by the service providing apparatus 110. In other words, the redirect information is information such as a URL indicative of acquisition destination of the R token of the target service issued by the service providing apparatus 110.

Next, the control program 65 of the information processing terminal 50 receives the redirect information from the service providing apparatus 110 through the communicator 55 (S19). The control program 65 then transmits the redirect information received in S19 to the relay apparatus 80 indicated by the redirect URL received in S15 through the communicator 55 (S20).

Next, the control program 95 of the relay apparatus 80 receives the redirect information from the information processing terminal 50 through the communicator 85 (S20). The control program 95 then transmits token requesting information to the service providing apparatus 110 through the communicator 85 (S21). The token requesting information is information for requesting transmission of the R token indicated by the redirect information.

The service providing apparatus 110 receives the token requesting information from the relay apparatus 80 (S21). The service providing apparatus 110 then issues R token "0x18A3" of the target service, and transmits the R token to the relay apparatus 80 (S22). Here, the processes of S11 to S22 may be executed in accordance with a known procedure compatible with the OAuth protocol, for example.

Next, the control program 95 of the relay apparatus 80 receives the R token from the service providing apparatus 110 through the communicator 85 (S22). Next, the control program 95 issues TempID "012" corresponding to the received R token (S23). As shown in FIG. 3B, the control program 95 adds, to the token list, a token record including the R token "0x18A3" received in S22 and the TempID "012" issued in S23 (S24). Here, the token record at this time does not include an R token ID, size information, an A token ID, and an A token. Further, the control program 95 transmits the TempID issued in S23 to the information processing terminal 50 through the communicator 85 (S25).

Figure 12B:
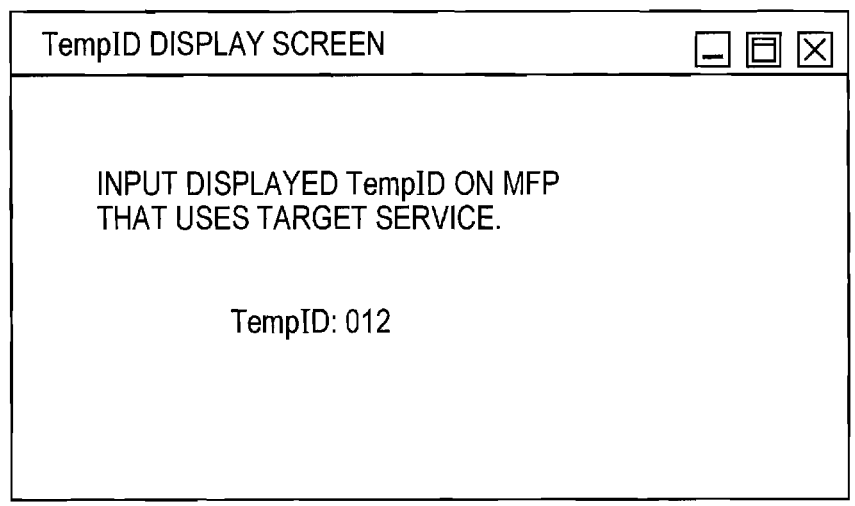

Next, the control program 65 of the information processing terminal 50 receives the TempID from the relay apparatus 80 through the communicator 55 (S25). The control program 65 then displays a TempID display screen on the display 53 (S26). FIG. 12B is an example of the TempID display screen. The TempID display screen shown in FIG. 12B includes a message that "Input displayed TempID on MFP that uses target service." and the TempID "012".

Figure 5:
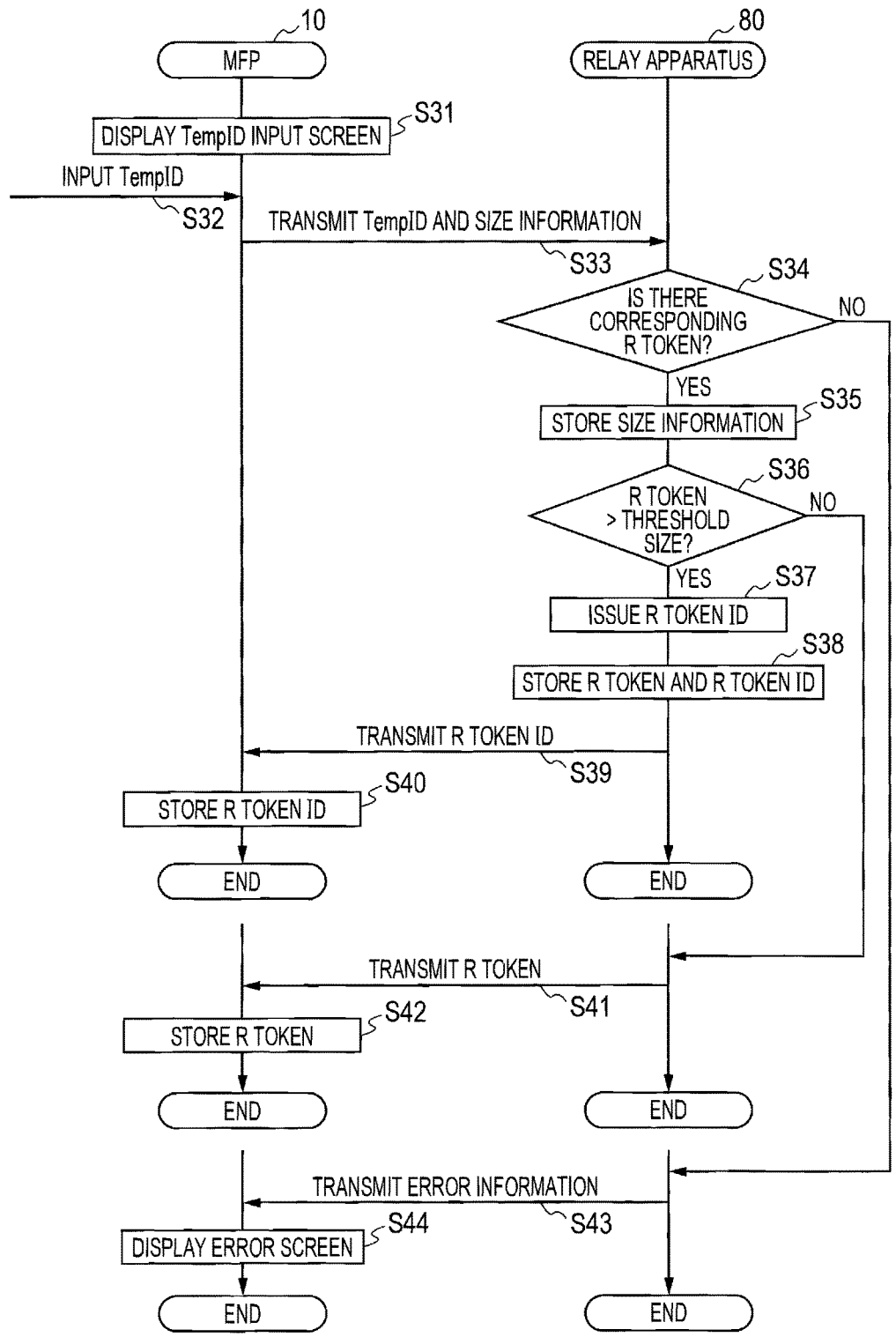
FIG. 5 is a flowchart showing a process in which the MFP 10 receives an R token or an R token ID from the relay apparatus 80.
Figure 13A:
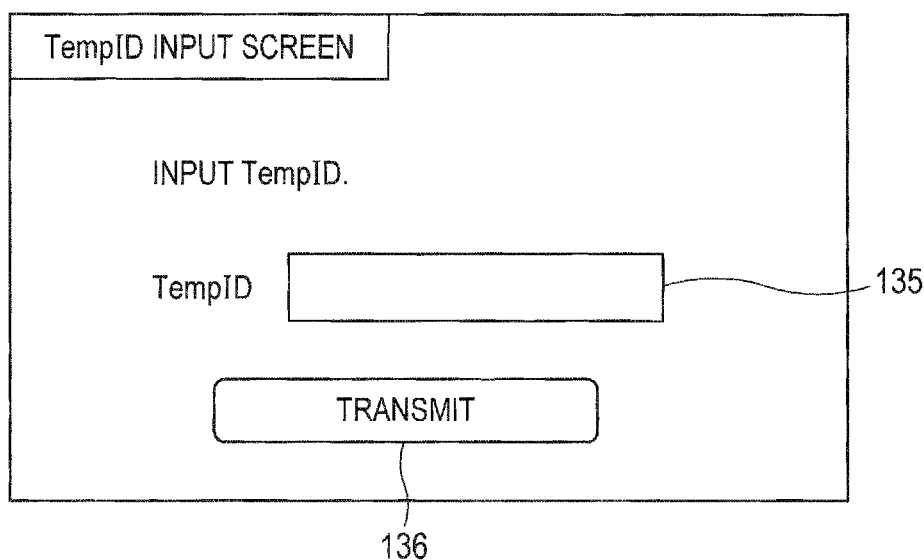

Next, as shown in FIG. 5, in response to receiving a user operation of instructing acquisition of the R token of the target service through the operating interface 24, the control program 35 of the MFP 10 displays a TempID input screen on the display 23 (S31). FIG. 13A is an example of the TempID input screen. The TempID input screen shown in FIG. 13A includes a message that "Input TempID.", a text box 135 that displays the TempID inputted through the operating interface 24, and a [Transmit] icon 136.

Next, the control program 35 receives, through the operating interface 24, a user operation of inputting the TempID "012" displayed on the display 53. In response to receiving selection of the [Transmit] icon 136 through the operating interface 24 (S32), the control program 35 transmits the inputted TempID and size information to the relay apparatus 80 through the communicator 25 (S33). The size information indicates the size of the storage area allocated for storing an R token and an A token in the data storage area 32B of the MFP 10. The size information of the present embodiment is 128 byte.

Next, the control program 95 of the relay apparatus 80 receives the TempID and the size information from the MFP 10 through the communicator 85 (S33). Next, the control program 95 reads out the R token "0x18A3" associated with the received TempID "012" from the token list (S34). The process of S33 is an example of a fifth receiving process and a sixth receiving process, and the process of S34 is an example of a second read-out process.

Next, in response to determining that there is a token record including the R token "0x18A3" associated with the received TempID "012" (S34: Yes), the control program 95 adds the size information received in S33 to this token record (S35). Further, the control program 95 determines whether the data size of the R token read in S34 is larger than a threshold size (S36). The threshold size is a data size indicated by the size information received in S33. The process of S36 is an example of a second determining process.

Next, in response to determining that the data size of the R token is larger than the threshold size (S36: Yes), the control program 95 issues an R token ID that identifies this R token "0x18A3" (S37). The control program 95 adds the R token ID issued in S37 to the token record including the corresponding R token "0x18A3" (S38). Further, the control program 95 transmits the R token ID issued in S37 to the MFP 10 through the communicator 85 (S39). The process of S37 is an example of a second issuing process, the process of S38 is an example of a second storing process, and the process of S39 is an example of a sixth transmitting process.

In response to determining that the data size of the R token is smaller than or equal to the threshold size (S36: No), the control program 95 transmits this R token "0x18A3" to the MFP 10 through the communicator 85 without executing the processes of S37 to S39 (S41). In response to determining that there is no token record including the R token "0x18A3" associated with the received TempID "012" (S34: No), the control program 95 transmits error information to the MFP 10 through the communicator 85 without executing the processes of S35 to S41 (S43). The error information is information indicating that there is no R token corresponding to the inputted TempID.

On the other hand, the control program 35 of the MFP 10 receives the R token ID, the R token, or the error information from the relay apparatus 80 through the communicator 25 (S39, S41, S43). In response to receiving the R token ID (S39), the control program 35 stores this R token ID in the data storage area 32B in association with the target service ID (S40). In response to receiving the R token (S41), the control program 35 stores this R token in the data storage area 32B in association with the target service ID (S42). It is preferable that the R token ID and the R token be stored in a nonvolatile storage area because the R token ID and the R token are needed each time a service is received from the service providing apparatus 110. Further, in response to receiving the error information (S43), the control program 35 displays an error screen (not shown) on the display 23 (S44). The error screen includes a message that "TempID is wrong.", for example.

Figure 6:
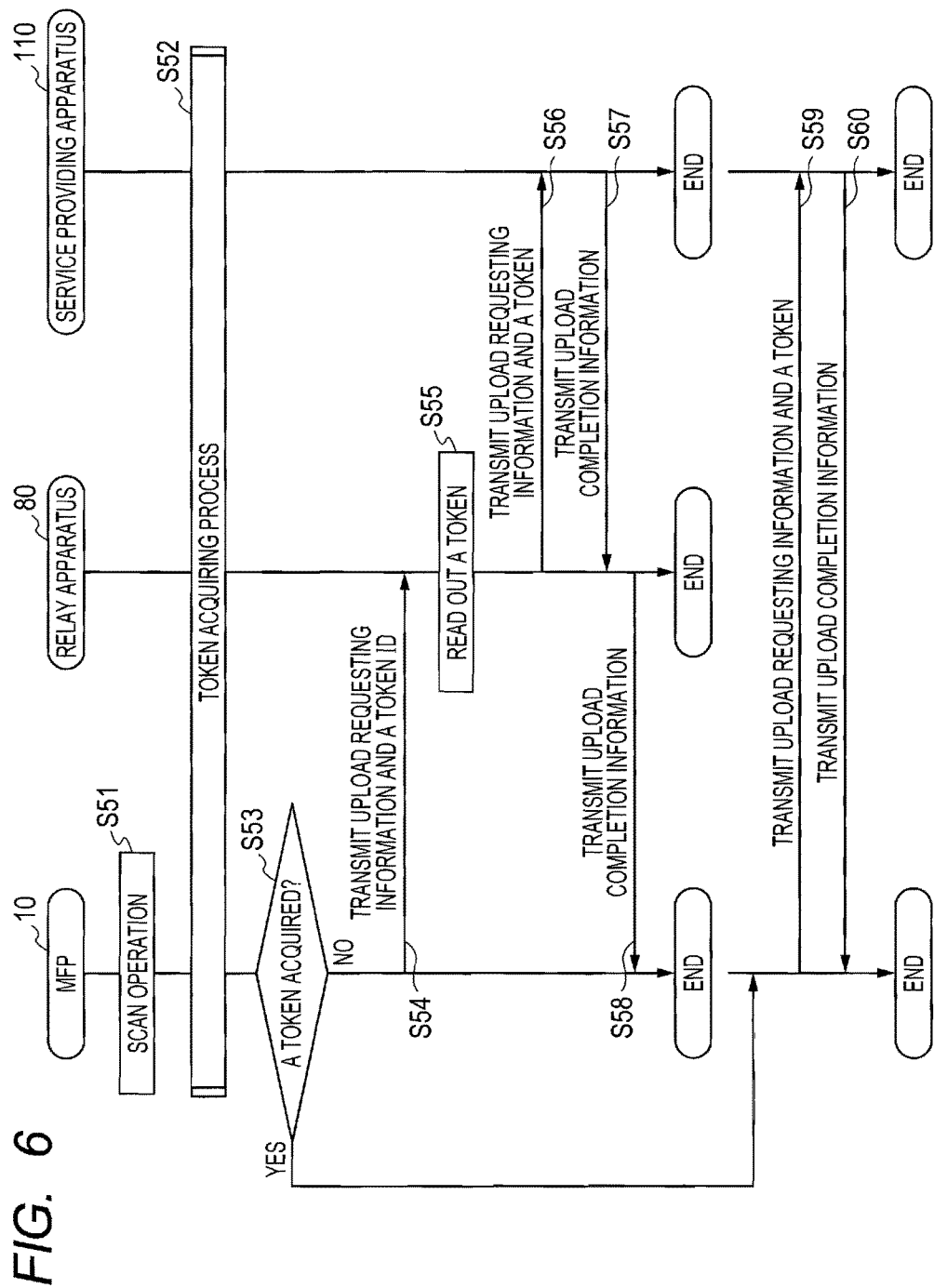
FIG. 6 is a flowchart showing a process of allowing the MFP 10 to use a scan upload service according to the embodiment.

Next, descriptions will be provided while referring to FIG. 6 for a process of allowing the MFP 10 to receive a service of storing image data generated by the scanner 12 of the MFP 10 in the service providing apparatus 110 (hereinafter referred to as "scan upload service") as one example of the target service.

First, in response to receiving a user operation of instructing execution of the scan upload service through the operating interface 24, the control program 35 of the MFP 10 controls the scanner 12 to perform a scan operation (S51). The scanner 12 reads an image recorded on an original document set on a contact glass or an ADF (Auto Document Feeder) (both not shown) and generates image data indicative of that image.

Next, the communication system 100 executes a token acquiring process (S52). The token acquiring process is a process of acquiring the A token of the target service from the service providing apparatus 110. The token acquiring process will be described in detail while referring to FIG. 8. Here, the sequence of executing S51 and S52 may be opposite. First, the control program 35 of the MFP 10 transmits the R token ID or the R token associated with the target service ID to the relay apparatus 80 through the communicator 25 (S101).

Next, the control program 95 of the relay apparatus 80 receives the R token ID or the R token from the MFP 10 through the communicator 85 (S101). In response to receiving the R token ID in S101 (S102: No), the control program 95 reads out the R token identified by this R token ID from the token list (S103). On the other hand, in response to receiving the R token in S101 (S102: Yes), the control program 95 skips the process of S103. The control program 95 then transmits the R token received in S101 or the R token read out in S103 to the service providing apparatus 110 through the communicator 55 (S104). The process of S103 is an example of a third read-out process, and the process of S104 is an example of a third transmitting process.

Next, the service providing apparatus 110 receives the R token from the relay apparatus 80 (S104). Next, the service providing apparatus 110 issues an A token "0x2C6EB" corresponding to the received R token "0x18A3", and transmits this A token to the relay apparatus 80 (S105).

Next, the control program 95 of the relay apparatus 80 receives the A token "0x2C6EB" from the service providing apparatus 110 through the communicator 85 (S105). Next, the control program 95 determines whether the data size of the received A token is larger than a threshold size (S106). In response to determining that the data size of the A token is larger than the threshold size (S106: Yes), the control program 95 issues an A token ID "ABC" that identifies this A token "0x2C6EB" (S107). The control program 95 adds the A token "0x2C6EB" received in S105 and the A token ID issued in S107 to the token record including the corresponding R token "0x18A3" (S108). The process of S106 is an example of a first determining process, the process of S107 is an example of a first issuing process, and the process of S108 is an example of a first storing process.

Further, the control program 95 transmits first communication instructing information to the MFP 10 through the communicator 85 (S109). The first communication instructing information is information including the A token ID issued in S107. Also, the first communication instructing information is information instructing the MFP 10 to transmit service requesting information described later and the A token ID to the relay apparatus 80. In other words, the first communication instructing information is information instructing performing communication with the service providing apparatus 110 for using the target service by way of the relay apparatus 80. The process of S109 is an example of a fourth transmitting process.

On the other hand, in response to determining that the data size of the A token is smaller than or equal to the threshold size (S106: No), the control program 95 transmits second communication instructing information to the MFP 10 through the communicator 85 without executing S107 to S109 (S110). The second communication instructing information is information including the A token received in S105. Also, the second communication instructing information is information instructing the MFP 10 to transmit service requesting information described later and the A token to the service providing apparatus 110. In other words, the second communication instructing information is information instructing performing communication with the service providing apparatus 110 for using the target service, not by way of the relay apparatus 80. That is, communication is performed directly between the MFP 10 and the service providing apparatus 110. The process of S110 is an example of a fifth transmitting process.

On the other hand, the control program 35 of the MFP 10 receives the first communication instructing information or the second communication instructing information from the relay apparatus 80 through the communicator 25 (S109, S110). The control program 35 then stores the received first communication instructing information or second communication instructing information in the data storage area 32B. The first communication instructing information and the second communication instructing information may be stored in a volatile storage area because these kinds of information are reacquired each time a service is received from the service providing apparatus 110.

Returning to FIG. 6, in response to acquiring the A token ID in the token acquiring process (S53: No), the control program 35 of the MFP 10 transmits upload requesting information and the A token ID acquired in S52 to the relay apparatus 80 through the communicator 25 (S54). The upload requesting information includes image data generated in S51 as upload data. The upload requesting information is an example of service requesting information for requesting a service of storing this upload data, that is, a scan upload service.

Next, the control program 95 of the relay apparatus 80 receives the upload requesting information and the A token ID from the MFP 10 through the communicator 85 (S54). Next, the control program 95 reads out the A token identified by the A token ID received in S54 from the token list (S55). The control program 95 then transmits the upload requesting information received in S54 and the A token read out in S55 to the service providing apparatus 110 through the communicator 85 (S56). The process of S54 is an example of a first receiving process, the process of S55 is an example of a first read-out process, and the process of S56 is an example of a first transmitting process.

Next, the service providing apparatus 110 receives the upload requesting information and the A token from the relay apparatus 80 (S56). Next, the service providing apparatus 110 stores the upload data included in the upload requesting information in the storage. The service providing apparatus 110 then transmits upload completion information to the relay apparatus 80 (S57). The upload completion information is an example of service information provided by the service providing apparatus 110 in accordance with the service requesting information. More specifically, the upload completion information is information indicating that the upload data included in the upload requesting information is stored.

Next, the control program 95 of the relay apparatus 80 receives the upload completion information from the service providing apparatus 110 through the communicator 85 (S57). The control program 95 then transmits the upload completion information to the MFP 10 through the communicator 85 (S58). The process of S57 is an example of a second receiving process, and the process of S58 is an example of a second transmitting process. The control program 35 of the MFP 10 receives the upload completion information from the relay apparatus 80 through the communicator 25 (S58).

On the other hand, in response to acquiring an A token in the token acquiring process (S53: Yes), the control program 35 transmits upload requesting information and the A token acquired in S52 to the service providing apparatus 110 through the communicator 25 (S59). The control program 35 then receives the upload completion information from the service providing apparatus 110 through the communicator 25 (S60). The processes of the service providing apparatus 110 having received the upload requesting information are the same as those described above, and the descriptions will not be repeated.

Figure 7:
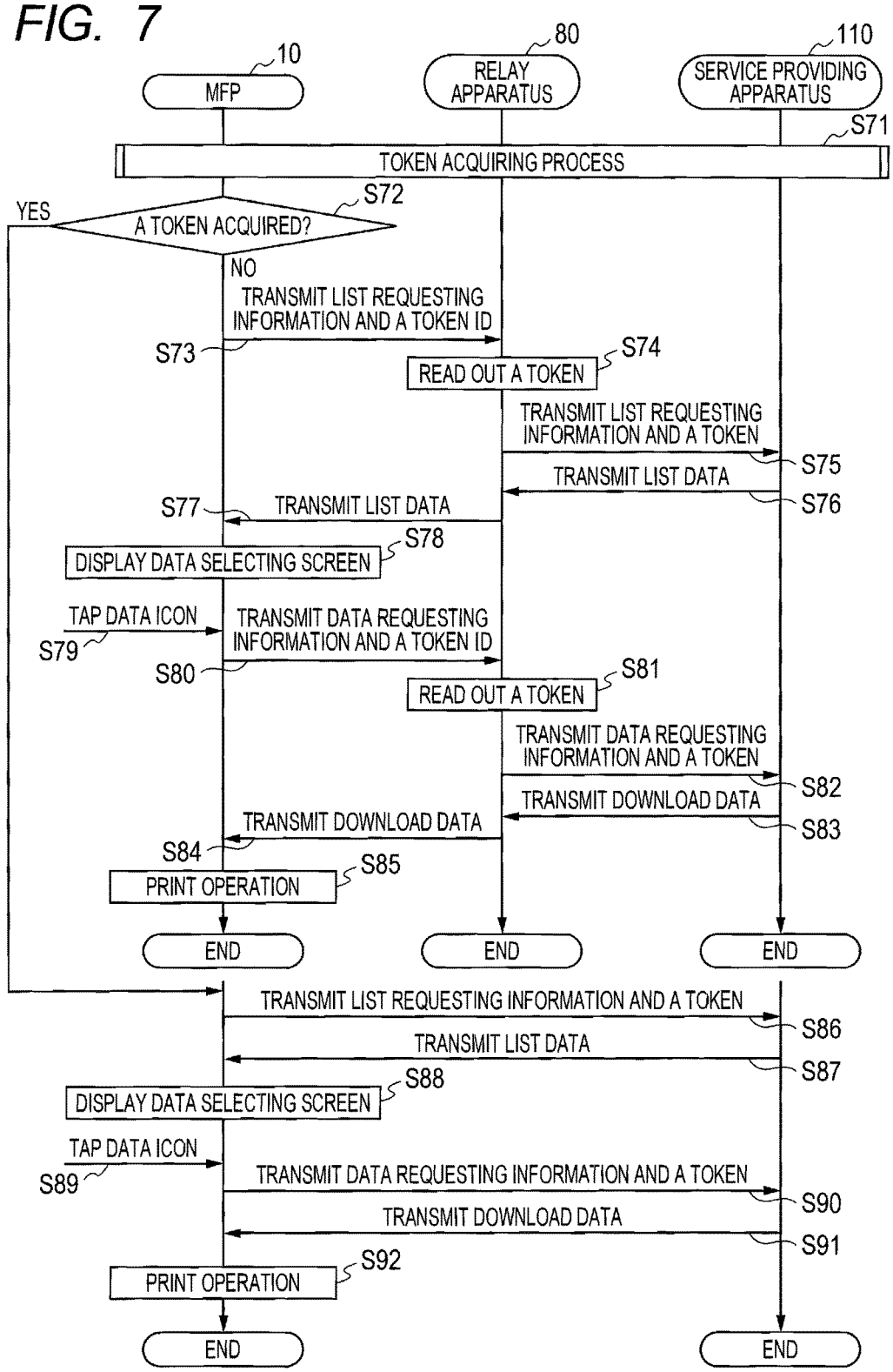
FIG. 7 is a flowchart showing a process of allowing the MFP 10 to use a download print service according to the embodiment.
Figure 8:
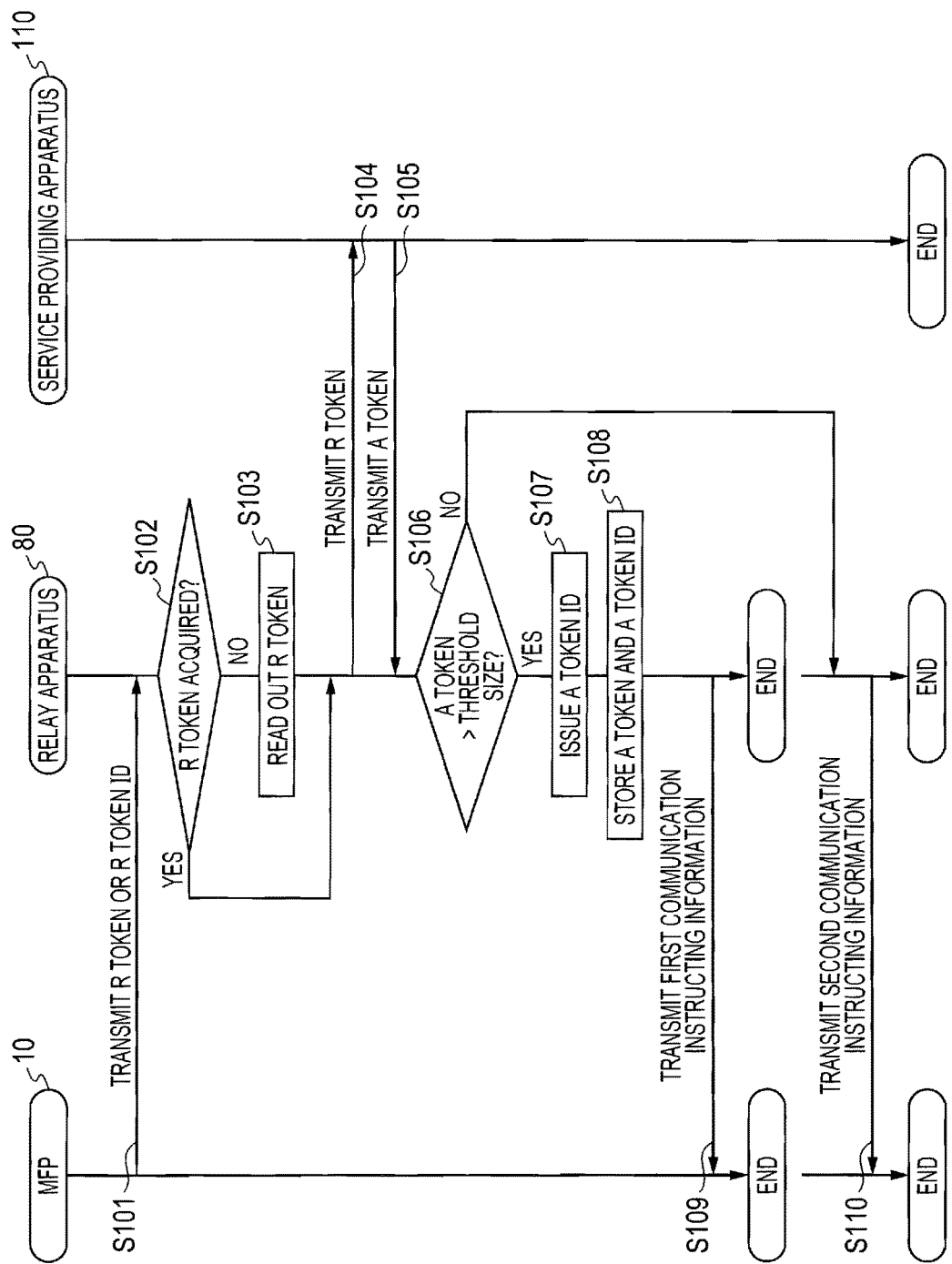
FIG. 8 is a flowchart of a token acquiring process.

Next, descriptions will be provided while referring to FIG. 7 for a process of allowing the MFP 10 to receive a service of downloading data stored in the service providing apparatus 110 for recording by the printer 11 (hereinafter referred to as "download print service") as one example of the target service.

First, in response to reception, by the MFP 10, of a user operation of instructing execution of the download print service, the communication system 100 executes the token acquiring process (S71). The details of the token acquiring process have already been described, and the descriptions will not be repeated.

Next, in response to acquiring the A token ID in the token acquiring process (S72: No), the control program 35 of the MFP 10 transmits list requesting information and the A token ID acquired in S71 to the relay apparatus 80 through the communicator 25 (S73). The list requesting information is an example of second service requesting information of requesting a service of transmitting list data. The list data is data indicative of a list of data identification information that identifies data stored in the service providing apparatus 110.

Next, the control program 95 of the relay apparatus 80 receives the list requesting information and the A token ID from the MFP 10 through the communicator 85 (S73). Next, the control program 95 reads out the A token identified by the A token ID received in S73 from the token list (S74). The control program 95 then transmits the list requesting information received in S73 and the A token read out in S74 to the service providing apparatus 110 through the communicator 85 (S75). The process of S73 is an example of the first receiving process, the process of S74 is an example of a first read-out process, and the process of S75 is an example of the first transmitting process.

Next, the service providing apparatus 110 receives the list requesting information and the A token from the relay apparatus 80 (S75). Next, the service providing apparatus 110 transmits list data to the relay apparatus 80 (S76). The list data is an example of second service information provided from the service providing apparatus 110 in accordance with the list requesting information.

Next, the control program 95 of the relay apparatus 80 receives the list data from the service providing apparatus 110 through the communicator 85 (S76). The control program 95 then transmits the list data to the MFP 10 through the communicator 85 (S77). The process of S76 is an example of the second receiving process, and the process of S77 is an example of the second transmitting process.

Figure 13B:
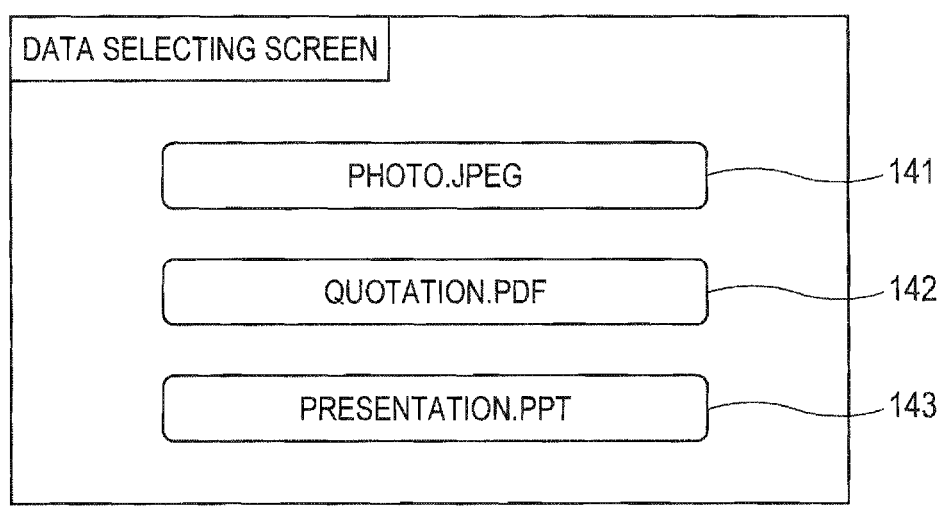

Next, the control program 35 of the MFP 10 receives the list data from the relay apparatus 80 through the communicator 25 (S77). Next, the control program 35 displays a data selecting screen on the display 23 (S78). FIG. 13B is an example of the data selecting screen. The data selecting screen shown in FIG. 13B includes data icons 141, 142, and 143 corresponding to a plurality of data identification information shown in the list data. The control program 35 receives selection of one of the data icons 141 to 143 through the operating interface 24 (S79).

Next, in response to receiving selection of the data icon 141 through the operating interface 24 (S79), for example, the control program 35 transmits data requesting information and the A token ID acquired in S71 to the relay apparatus 80 through the communicator 25 (S80). The data requesting information is an example of first service requesting information for requesting a service of transmitting, as download data, data indicative of an image to be recorded by the printer 11 out of data stored in the service providing apparatus 110. The data requesting information includes data identification information corresponding to the data icon 141 selected in S79 out of data identification information included in the list data. The selection of data icon is an example of a user operation of specifying data identification information.

Next, the control program 95 of the relay apparatus 80 receives the data requesting information and the A token ID from the MFP 10 through the communicator 85 (S80). Next, the control program 95 reads out the A token identified by the A token ID received in S80 from the token list (S81). The control program 95 then transmits the data requesting information received in S80 and the A token read in S81 to the service providing apparatus 110 through the communicator 85 (S82). The process of S80 is an example of the first receiving process, the process of S81 is an example of a first read-out process, and the process of S82 is an example of the first transmitting process.

Next, the service providing apparatus 110 receives the data requesting information and the A token from the relay apparatus 80 (S82). Next, the service providing apparatus 110 transmits download data to the relay apparatus 80 (S83). The download data is an example of first service information that is provided from the service providing apparatus 110 in accordance with the data requesting information. The download data is data identified by the data identification information included in the data requesting information.

Next, the control program 95 of the relay apparatus 80 receives the download data from the service providing apparatus 110 through the communicator 85 (S83). The control program 95 then transmits the download data to the MFP 10 through the communicator 85 (S84). The process of S83 is an example of the second receiving process, and the process of S84 is an example of the second transmitting process.

Next, the control program 35 of the MFP 10 receives the download data from the relay apparatus 80 through the communicator 25 (S84). The control program 35 then controls the printer 11 to perform a recording operation for the received download data (S85). That is, the printer 11 records an image indicated by the download data on recording paper.

On the other hand, in response to acquiring the A token in the token acquiring process (S72: Yes), the control program 35 transmits list requesting information and the A token acquired in S71 to the service providing apparatus 110 through the communicator 25 (S86). The control program 35 then receives list data from the service providing apparatus 110 through the communicator 25 (S87). The control program 35 transmits data requesting information and the A token acquired in S71 to the service providing apparatus 110 through the communicator 25 (S90). Further, the control program 35 receives download data from the service providing apparatus 110 through the communicator 25 (S91).

Here, the processes of S88, S89, and S92 are the same as those of S78, S79, and S85, and hence the descriptions will not be repeated. Also, the processes of the service providing apparatus 110 having received the list requesting information or the data requesting information are the same as those described above, and hence the descriptions will not be repeated.

Effects of the Present Embodiment

In the data storage area 32B of the MFP 10 of the above-described configuration, a large area is allocated for storing image data such as print data and scan data, and an area that can be allocated for storing tokens is limited. Also, if an EEPROM or RAM having a large storage area is adopted for storing tokens of large data size, there is a possibility that the price of the MFP 10 increases.

According to the above-described embodiment, when the service requesting information is transmitted from the MFP 10 to the service providing apparatus 110 through the relay apparatus 80 (S54, S73, S80), the A token ID added to this service requesting information is replaced with the A token by the relay apparatus 80. With this process, without storing the A token of large data size in the MFP 10, the MFP 10 can use a service provided by the service providing apparatus 110.

More specifically, when the data size of the A token is larger than the threshold size, the relay apparatus 80 relays the service requesting information and the service information. In contrast, when the data size of the A token is smaller than or equal to the threshold size, the service requesting information and the service information are transmitted and received without passing through the relay apparatus 80. This process increases the efficiency of data communication between the MFP 10 and the service providing apparatus 110.

Further, the maximum size of an A token that can be stored differs depending on the MFP 10. Hence, in the above-described embodiment, the relay apparatus 80 relays only the service requesting information of the MFP 10 that cannot store the A token. As a result, in a case where a large number of MFPs 10 are connected to the relay apparatus 80, the processing burden of the relay apparatus 80 can be reduced.

According to the above-described embodiment, as well as the A token, without storing the R token of large data size in the MFP 10, the MFP 10 can acquire the A token ID that identifies the A token issued based on this R token. However, the process of S36 to S39 of FIG. 5 and S102, S103 of FIG. 8 may be omitted.

While the disclosure has been described in detail with reference to the above aspects thereof, it would be apparent to those skilled in the art that various changes and modifications may be made therein without departing from the scope of the claims.

The timing of determining the data size of the A token is not limited to S106. The relay apparatus 80 may acquire, from the service providing apparatus 110, the A token corresponding to the R token received in S22, immediately after S22, for example. The relay apparatus 80 may store, in the data storage area 92B, information indicative of a comparison result between the data size of the acquired A token and the threshold size. The timing of acquiring size information is not limited to S33. That is, size information may be added to arbitrary information that is transmitted from the MFP 10 to the relay apparatus 80.

In the above-described embodiment, it is required to input the TempID displayed on the display 53 of the information processing terminal 50 to the MFP 10, so that the MFP 10 acquires an R token or R token ID. However, the method in which the MFP 10 acquires the R token or R token ID is not limited to this.

For example, in a case where the MFP 10 and the information processing terminal 50 are configured to perform NFC (Near Field Communication) communication, in S25 the relay apparatus 80 may transmit the R token or R token ID to the information processing terminal 50 through the communicator 85. And, immediately before S101, the MFP 10 may receive the R token or R token ID from the information processing terminal 50 through the NFC communicator. The NFC communication is an example of near-field wireless communication or direct wireless communication, and may be changed to Bluetooth™ (trademark of Bluetooth), Bluetooth LE, or the like.

In the above-described embodiment, the relay apparatus 80 replaces the A token ID that is an example of the first identification information with the A token that is an example of the first authentication information. However, a specific example of the first identification information is not limited to the A token ID. In the following modification, the relay apparatus 80 replaces the R token that is an example of the first identification information with the A token that is an example of the first authentication information. In this case, it is assumed that the data size of the R token is smaller than the data size of the corresponding A token.

In the following modification, the processes executed by the first apparatus 80A and the second apparatus 80B constituting the relay apparatus 80 are differentiated. Hereinafter, when the elements of the first apparatus 80A are described, a letter "A" is appended to the end of elements of the relay apparatus 80 shown in FIG. 3A. Similarly, when the elements of the second apparatus 80B are described, a letter "B" is appended to the end of elements of the relay apparatus 80 shown in FIG. 3A. However, the roles of the first apparatus 80A and the second apparatus 80B are not limited to the following example.

Modification

Figure 9:
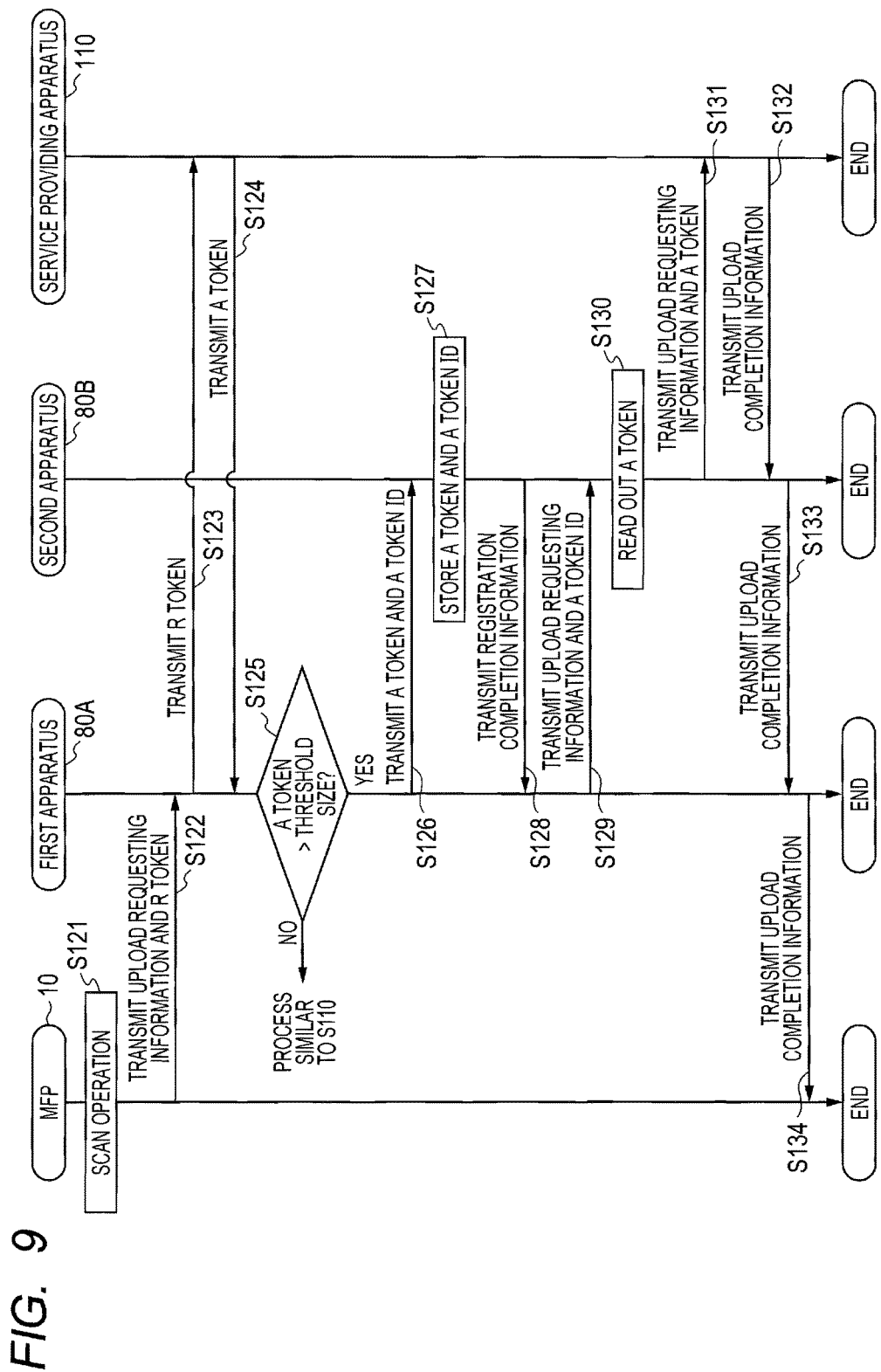
FIG. 9 is a flowchart showing a process of allowing the MFP 10 to use the scan upload service according to a modification.

Descriptions will be provided while referring to FIG. 9 for a modification of the process of allowing the MFP 10 to use a scan upload service that is an example of the target service. Here, details of the same processes as those in FIG. 6 will be omitted and differences will be mainly described.

First, the control program 35 of the MFP 10 controls the scanner 12 to perform a scan operation (S121). Next, the control program 35 transmits upload requesting information and an R token to the first apparatus 80A through the communicator 25 (S122). Here, it is assumed that the MFP 10 of the modification has received the R token in S41 of FIG. 5.

Next, the control program 95A of the first apparatus 80A receives the upload requesting information and the R token from the MFP 10 through the communicator 85A (S122). Next, the control program 95A transmits the R token to the service providing apparatus 110 through the communicator 85A (S123). The control program 95A then receives the A token corresponding to this R token from the service providing apparatus 110 through the communicator 85A (S124). The process of S122 is an example of the first receiving process, the process of S123 is an example of the third transmitting process, and the process of S124 is an example of a third receiving process.

Next, the control program 95A determines whether the data size of the received A token is larger than the threshold size (S125). In response to determining that the data size of the A token is larger than the threshold size (S125: Yes), the control program 95A issues an A token ID that identifies this A token and transmits the A token and the A token ID to the second apparatus 80B through the communicator 85A (S126). On the other hand, in response to determining that the data size of the A token is smaller than or equal to the threshold size (S125: No), a process similar to the process of S110 in FIG. 8 may be executed, for example. The same goes for S144 described later. The process of S125 is an example of the first determining process, and the process of issuing the A token ID is an example of the first issuing process.

Next, the control program 95B of the second apparatus 80B receives the A token and the A token ID from the first apparatus 80A through the communicator 85B (S126). The control program 95B then adds the received A token and A token ID to the token list (S127). The process of S127 is an example of the first storing process. The control program 95B then transmits registration completion information to the first apparatus 80A through the communicator 85B (S128). The registration completion information is information indicating that the A token and the A token ID have been added to the token list.

Next, the control program 95A of the first apparatus 80A receives the registration completion information from the second apparatus 80B through the communicator 85A (S128). Next, the control program 95A transmits the upload requesting information received in S122 and the A token ID issued in S126 to the second apparatus 80B through the communicator 85A (S129).

Next, the control program 95B of the second apparatus 80B receives the upload requesting information and the A token ID from the first apparatus 80A through the communicator 85B (S129). Next, the control program 95B reads out the A token identified by the received A token ID from the token list (S130). Next, the control program 95B transmits the upload requesting information received in S129 and the A token read out in S130 to the service providing apparatus 110 through the communicator 85B (S131). Next, the control program 95B receives the upload completion information from the service providing apparatus 110 through the communicator 85B (S132). The process of S130 is an example of the first read-out process, the process of S131 is an example of the first transmitting process, and the process of S132 is an example of the second receiving process.

Next, the control program 95B transmits the upload completion information to the first apparatus 80A through the communicator 85B (S133). Next, the control program 95A of the first apparatus 80A receives the upload completion information from the second apparatus 80B through the communicator 85A (S133). The control program 95A then transmits the upload completion information to the MFP 10 through the communicator 85A (S134). The process of S134 is an example of the second transmitting process. Further, the control program 35 of the MFP 10 receives the upload completion information from the first apparatus 80A through the communicator 25 (S134).

Figure 10:
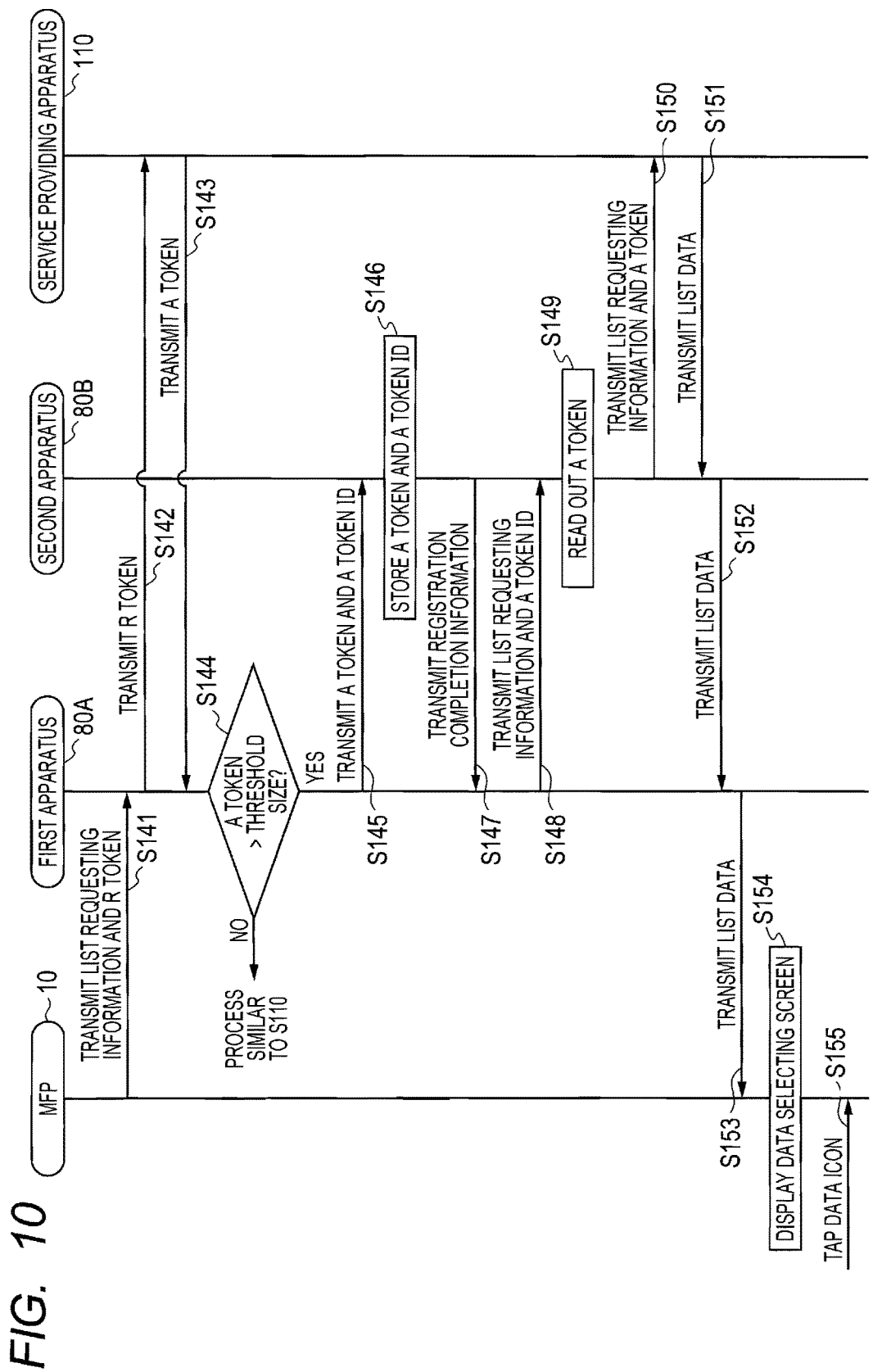
FIG. 10 is a flowchart showing a first half of a process of allowing the MFP to use the download print service according to a modification.
Figure 11:
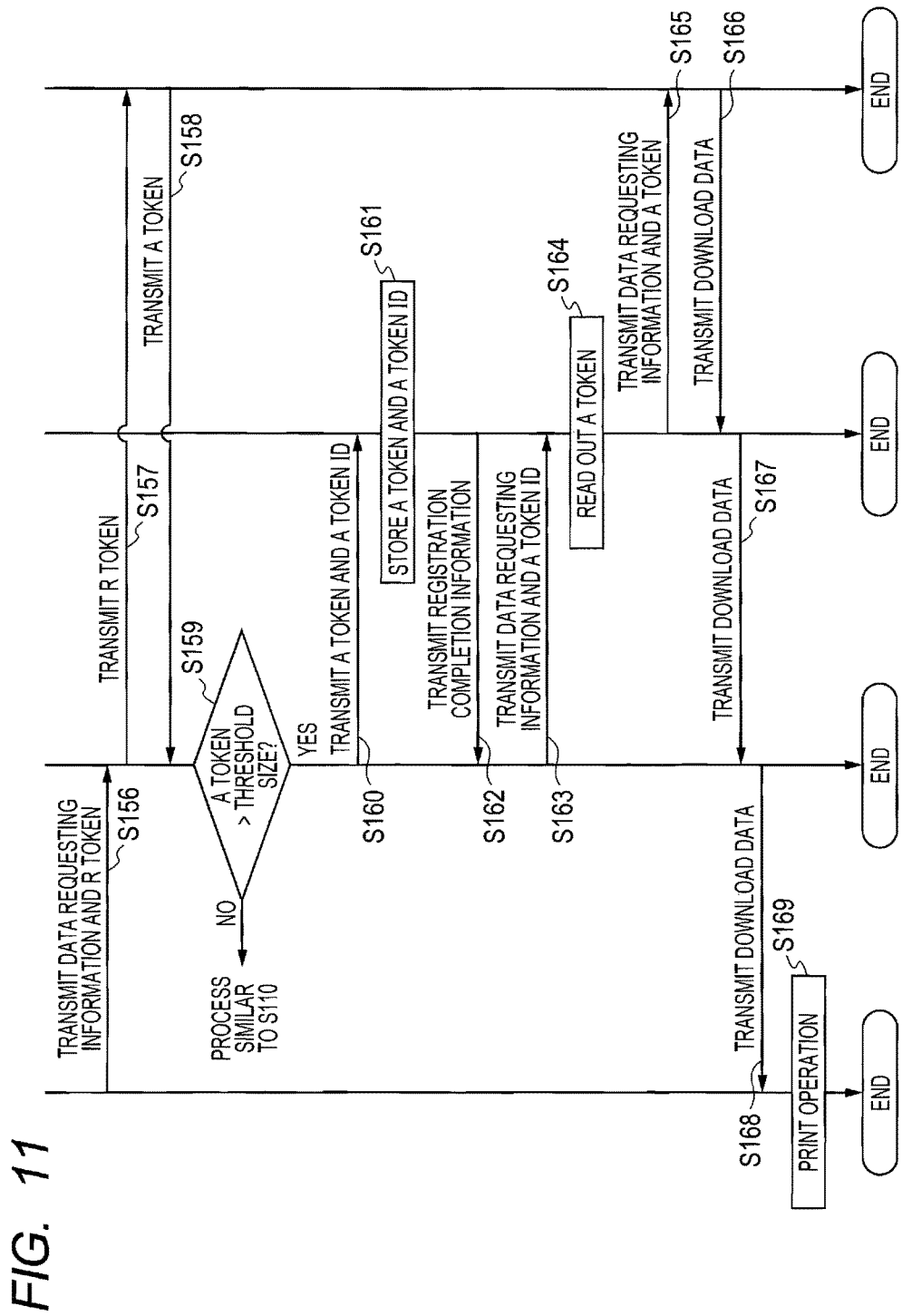
FIG. 11 is a flowchart showing a second half of the process of allowing the MFP to use the download print service according to the modification.

Descriptions will be provided while referring to FIGS. 10 and 11 for a modification of the process of allowing the MFP 10 to use a download print service that is an example of the target service. Here, details of the same processes as those in FIGS. 7 and 9 will be omitted and differences will be mainly described.

First, the control program 35 of the MFP 10 transmits list requesting information and R token to the first apparatus 80A through the communicator 25 (S141). Here, it is assumed that the MFP 10 of the modification has received the R token in S41 of FIG. 5.

Next, the control program 95A of the first apparatus 80A receives the list requesting information and the R token from the MFP 10 through the communicator 85A (S141). The process of S141 is an example of the first receiving process. The processes of S142 to S147 are the same as those of S123 to S128 in FIG. 9, and the descriptions will not be repeated. Next, the control program 95A transmits the list requesting information received in S141 and the A token ID issued in S145 to the second apparatus 80B through the communicator 85A (S148).

Next, the control program 95B of the second apparatus 80B receives the list requesting information and the A token ID from the first apparatus 80A through the communicator 85B (S148). Next, the control program 95B reads out the A token identified by the received A token ID from the token list (S149). Next, the control program 95B transmits the list requesting information received in S148 and the A token read out in S149 to the service providing apparatus 110 through the communicator 85B (S150). Next, the control program 95B receives the list data from the service providing apparatus 110 through the communicator 85B (S151). The process of S149 is an example of the first read-out process, the process of S150 is an example of the first transmitting process, and the process of S151 is an example of the second receiving process.

Next, the control program 95B transmits the list data to the first apparatus 80A through the communicator 85B (S152). Next, the control program 95A of the first apparatus 80A receives the list data from the second apparatus 80B through the communicator 85A (S152). The control program 95A then transmits the list data to the MFP 10 through the communicator 85A (S153). The process of S153 is an example of the second transmitting process.

Next, the control program 35 of the MFP 10 receives the list data from the first apparatus 80A through the communicator 25 (S153). The processes of S154, S155 are the same as those of S78, S79 in FIG. 7, and the descriptions will not be repeated. The control program 35 transmits data requesting information and the R token to the first apparatus 80A through the communicator 25 (S156).

Next, the control program 95A of the first apparatus 80A receives the data requesting information and the R token from the MFP 10 through the communicator 85A (S156). The process of S156 is an example of the first receiving process. The processes of S157 to S162 are the same as those of S123 to S128 in FIG. 9, and the descriptions will not be repeated. Next, the control program 95A transmits the data requesting information received in S156 and the A token ID issued in S160 to the second apparatus 80B through the communicator 85A (S163).

Next, the control program 95B of the second apparatus 80B receives the data requesting information and the A token ID from the first apparatus 80A through the communicator 85B (S163). Next, the control program 95B reads out the A token identified by the received A token ID from the token list (S164). Next, the control program 95B transmits the data requesting information received in S163 and the A token read out in S164 to the service providing apparatus 110 through the communicator 85B (S165). Next, the control program 95B receives download data from the service providing apparatus 110 through the communicator 85B (S166). The process of S164 is an example of the first read-out process, the process of S165 is an example of the first transmitting process, and the process of S166 is an example of the second receiving process.

Next, the control program 95B transmits the download data to the first apparatus 80A through the communicator 85B (S167). Next, the control program 95A of the first apparatus 80A receives the download data from the second apparatus 80B through the communicator 85A (S167). The control program 95A then transmits the download data to the MFP 10 through the communicator 85A (S168). The process of S168 is an example of the second transmitting process.

Next, the control program 35 of the MFP 10 receives the download data from the first apparatus 80A through the communicator 25 (S168). The process of S169 is the same as that of S85 in FIG. 7, and descriptions will not be repeated.

According to the above-described modification, when the service requesting information is transmitted from the MFP 10 to the service providing apparatus 110 through the relay apparatus 80 (S122, S141, S156), the relay apparatus 80 replaces the R token added to this service requesting information with the A token. With this process, without storing an A token having a large data size in the MFP 10, the MFP 10 can use a service provided by the service providing apparatus 110.

The control program 95 of the relay apparatus 80 may execute a converting process of converting the format of upload data included in the upload requesting information received in S129 from a first format to a second format different from the first format. And, in S131 the control program 95 may transmit, to the service providing apparatus 110, upload requesting information including upload data of the second format that is converted in the converting process. As a result, image data generated by the scanner 12 can be stored in the service providing apparatus 110 in a desired format.

The first format in this case is an image format that is the format of data generated by the scan operation. The second format in this case is an arbitrary format such as a text format, a document format, a spreadsheet format, and a presentation format, for example. The second format may be specified by the user of the MFP 10. And, in S122, for example, the control program 35 of the MFP 10 may transmit upload requesting information further including format information indicative of the second format, to the relay apparatus 80 through the communicator 25.

Similarly, the control program 95 may execute a converting process of converting the format of download data received in S166 from a first format to a second format different from the first format. And, in S168 the control program 95 may transmit download data of the second format converted in the converting process to the MFP 10.

As a result, data stored in the service providing apparatus 110 can be transmitted to the MFP 10 after the data is converted to a format that can be recognized by the printer 11.

The first format in this case is an arbitrary format such as a text format, a document format, a spreadsheet format, and a presentation format. The second format in this case is a format for which the printer 11 of the MFP 10 can perform a recording operation, and is an image format, for example. And, in S156, for example, the control program 35 of the MFP 10 may transmit data requesting information further including format information indicative of the second format, to the relay apparatus 80 through the communicator 25.

For example, the converting process may be executed by a third apparatus different from the first apparatus 80A and the second apparatus 80B. More specifically, in the processes between S128 and S131, the second apparatus 80B may transmit upload data of the first format to the third apparatus, and may receive upload data of the second format from the third apparatus. Similarly, in the processes between S166 and S167, the second apparatus 80B may transmit download data of the first format to the third apparatus, and may receive download data of the second format from the third apparatus. Further, the converting process may be applied to FIGS. 6 and 8.

An example is described in which the CPUs 31, 61, and 91 execute various programs stored in the program storage areas 32A, 62A, and 92A of the storage 32, 62, and 92 in the MFP 10, the information processing terminal 50, and the relay apparatus 80 of each embodiment, thereby realizing each process executed by the processor of this disclosure. However, the configuration of the processor is not limited to this, and a part or an entirety of the processor may be realized by hardware such as an IC (Integrated Circuit) and so on.

This disclosure may be realized not only as the MFP 10, the information processing terminal 50, and the relay apparatus 80 but also as a program for controlling the MFP 10, the information processing terminal 50, and the relay apparatus 80 to execute processes. This program may be provided by a non-transitory recording medium. In addition to a CD-ROM, a DVD-ROM, and so on, a non-transitory recording medium may include a storage mounted on a server configured to be connected to the MFP 10, the information processing terminal 50, and the relay apparatus 80 through a communication network. The program stored in the storage of the server may be delivered through a communication network such as Internet, as information or signals indicative of this program.

What is claimed is:

1. A relay apparatus comprising:
   a communicator configured to perform communication with an image forming apparatus configured to perform an image forming operation and with a service providing apparatus configured to provide the image forming apparatus with a service;
   a processor; and
   a memory configured to store first authentication information and first identification information identifying the first authentication information, the first authentication information being issued by the service providing apparatus for indicating authority to receive a service provided by the service providing apparatus, the first identification information having a smaller data size than the first authentication information corresponding to the first identification information, the memory storing instructions, the instructions, when executed by the processor, causing the relay apparatus to execute:
- a first receiving process of receiving service requesting information and the first identification information from the image forming apparatus through the communicator, the service requesting information being information requesting a service provided by the service providing apparatus;
- a first read-out process of reading out, from the memory, the first authentication information identified by the first identification information received by the first receiving process;
- a first transmitting process of transmitting, to the service providing apparatus through the communicator, the service requesting information received by the first receiving process and the first authentication information read out by the first read-out process;
- a second receiving process of receiving service information corresponding to the service requesting information from the service providing apparatus through the communicator, the service information being information provided by the service providing apparatus in response to the service requesting information; and
- a second transmitting process of transmitting the service information received by the second receiving process to the image forming apparatus through the communicator.

2. The relay apparatus according to claim 1, wherein the memory further stores instructions, the instructions, when executed by the processor, causing the relay apparatus to execute:
- a third receiving process of receiving second authentication information from the image forming apparatus through the communicator, the second authentication information being issued by the service providing apparatus, the second authentication information being indicative of authority to acquire the first authentication information;
- a third transmitting process of transmitting the second authentication information received by the third receiving process to the service providing apparatus through the communicator;
- a fourth receiving process of receiving the first authentication information from the service providing apparatus through the communicator, the first authentication information being issued in association with the second authentication information;
- a first determining process of determining whether a data size of the first authentication information received by the fourth receiving process is larger than a threshold size;
- a first issuing process of, in response to determining in the first determining process that the data size of the first authentication information is larger than the threshold size, issuing the first identification information that identifies the first authentication information;
- a first storing process of storing, in the memory, the first authentication information received by the fourth receiving process and the first identification information issued by the first issuing process in association with each other; and
- a fourth transmitting process of transmitting first communication instructing information to the image forming apparatus through the communicator, the first communication instructing information including the first identification information issued by the first issuing process, the first communication instructing information being information instructing transmission of the service requesting information and the first identification information to the relay apparatus.

3. The relay apparatus according to claim 2, wherein the memory further stores instructions, the instructions, when executed by the processor, causing the relay apparatus to execute:
- a fifth transmitting process of, in response to determining in the first determining process that the data size of the first authentication information is smaller than or equal to the threshold size, transmitting second communication instructing information to the image forming apparatus through the communicator, the second communication instructing information including the first authentication information received by the fourth receiving process, the second communication instructing information being information instructing transmission of the service requesting information and the first authentication information to the service providing apparatus.

4. The relay apparatus according to claim 2, wherein the memory further stores instructions, the instructions, when executed by the processor, causing the relay apparatus to execute:
- a fifth receiving process of receiving size information from the image forming apparatus through the communicator, the size information being indicative of a maximum size of the first authentication information stored in the image forming apparatus; and
- wherein, in the first determining process, the threshold size is a size indicated by the size information received by the fifth receiving process.

5. The relay apparatus according to claim 2, wherein the memory stores the second authentication information and temporary identification information associated with the second authentication information; and
- wherein the memory further stores instructions, the instructions, when executed by the processor, causing the relay apparatus to execute:
  - a sixth receiving process of receiving the temporary identification information from the image forming apparatus through the communicator;
  - a second read-out process of reading out, from the memory, the second authentication information associated with the temporary identification information received by the sixth receiving process;
  - a second determining process of determining whether a data size of the second authentication information read out by the second read-out process is larger than a threshold size;
  - a second issuing process of, in response to determining in the second determining process that the data size of the second authentication information is larger than the threshold size, issuing second identification information that identifies the second authentication information and that has a smaller data size than the second authentication information;
  - a second storing process of storing, in the memory, the second authentication information read out in the second read-out process and the second identification information issued by the second issuing process in association with each other; and a sixth transmitting process of transmitting the second identification information issued by the second issuing process to the image forming apparatus through the communicator.

6. The relay apparatus according to claim 5, wherein the memory further stores instructions, the instructions, when executed by the processor, causing the relay apparatus to execute:
a seventh transmitting process of, in response to determining in the second determining process that the data size of the second authentication information is smaller than or equal to the threshold size, transmitting the second authentication information to the image forming apparatus through the communicator without issuing the second identification information.

7. The relay apparatus according to claim 5, wherein the memory further stores instructions, the instructions, when executed by the processor, causing the relay apparatus to execute:
a third read-out process of, in response to receiving the second identification information instead of the second authentication information in the third receiving process, reading out, from the memory, the second authentication information identified by the second identification information; and
wherein the third transmitting process comprises transmitting the second authentication information read out by the third read-out process to the service providing apparatus through the communicator.

8. The relay apparatus according to claim 1, wherein the first identification information is second authentication information issued by the service providing apparatus, the second authentication information being indicative of authority to acquire the first authentication information;
wherein the memory further stores instructions, the instructions, when executed by the processor, causing the relay apparatus to, before the first read-out process, the first transmitting process, the second receiving process, and the second transmitting process, execute:
a third transmitting process of transmitting the second authentication information received by the first receiving process to the service providing apparatus through the communicator;
a third receiving process of receiving the first authentication information from the service providing apparatus through the communicator, the first authentication information being issued in association with the second authentication information; and
a storing process of storing the first authentication information received by the third receiving process in the memory.

9. The relay apparatus according to claim 1, wherein the image forming apparatus has a reader configured to read an image recorded on an original document and to generate image data;
wherein the service requesting information includes the image data generated by the reader as upload data, the service requesting information being information requesting a service of storing the upload data; and
wherein the service information is information indicating that the upload data included in the service requesting information is stored.

10. The relay apparatus according to claim 9, wherein the memory further stores instructions, the instructions, when executed by the processor, causing the relay apparatus to execute:

a converting process of converting a format of the upload data included in the service requesting information from a first format to a second format different from the first format; and
wherein the first transmitting process comprises transmitting the service requesting information including the upload data of the second format to the service providing apparatus through the communicator.

11. The relay apparatus according to claim 1, wherein the image forming apparatus comprises a recorder configured to record an image indicated by image data on a sheet;
wherein the service requesting information includes first service requesting information of requesting a service of transmitting, as download data, data indicative of an image to be recorded by the recorder out of data stored in the service providing apparatus; and
wherein the service information includes first service information that is the download data indicated by the first service requesting information.

12. The relay apparatus according to claim 11, wherein the service requesting information includes second service requesting information of requesting a service of transmitting list data indicative of a list of data identification information that identifies the data stored in the service providing apparatus;
wherein the service information includes second service information that is the list data requested by the second service requesting information;
wherein the first service requesting information includes the data identification information specified by a user of the image forming apparatus, out of the data identification information included in the list data; and
wherein the first service information is the download data identified by the data identification information included in the first service requesting information.

13. The relay apparatus according to claim 11, wherein the memory further stores instructions, the instructions, when executed by the processor, causing the relay apparatus to execute:
a converting process of converting a format of the download data included in the first service information from a first format to a second format that is an image format; and
wherein the second transmitting process comprises transmitting the first service information including the download data of the second format to the image forming apparatus through the communicator.

14. The relay apparatus according to claim 1, wherein the relay apparatus comprises:
a first apparatus having a first communicator and a first processor; and
a second apparatus having the memory, a second communicator, and a second processor;
wherein the first processor is configured to execute the first receiving process and the second transmitting process; and
wherein the second processor is configured to execute the first read-out process, the first transmitting process, and the second receiving process.

15. A communication system comprising a relay apparatus and an image forming apparatus,
the relay apparatus comprising:
a first communicator configured to perform communication with the image forming apparatus and a service providing apparatus;
a server processor; and a first memory configured to store first authentication information and first identification information identifying the first authentication information, the first authentication information being issued by the service providing apparatus for indicating authority to receive a service provided by the service providing apparatus, the first identification information having a smaller data size than the first authentication information corresponding to the first identification information, the first memory storing instructions, the instructions, when executed by the processor, causing the relay apparatus to execute:

a first receiving process of receiving service requesting information and the first identification information from the image forming apparatus through the first communicator, the service requesting information being information requesting a service provided by the service providing apparatus;

a first read-out process of reading out, from the first memory, the first authentication information identified by the first identification information received by the first receiving process;

a first transmitting process of transmitting, to the service providing apparatus through the first communicator, the service requesting information received by the first receiving process and the first authentication information read out by the first read-out process;

a second receiving process of receiving service information corresponding to the service requesting information from the service providing apparatus through the first communicator, the service information being information provided by the service providing apparatus in response to the service requesting information; and a second transmitting process of transmitting the service information received by the second receiving process to the image forming apparatus through the first communicator, the image forming apparatus comprising:

an image forming device configured to form an image;

an apparatus communicator configured to perform communication with the relay apparatus;

an apparatus processor; and an apparatus memory storing instructions, the instructions, when executed by the apparatus processor, causing the image forming apparatus to:

transmit the service requesting information and the first identification information to the relay apparatus through the apparatus communicator; and receive the service information from the relay apparatus through the apparatus communicator.

16. The communication system according to claim 15, wherein the first memory further stores instructions, the instructions, when executed by the server processor, causing the relay apparatus to execute:

a third receiving process of receiving second authentication information from the image forming apparatus through the first communicator, the second authentication information being issued by the service providing apparatus, the second authentication information being indicative of authority to acquire the first authentication information;

a third transmitting process of transmitting the second authentication information received by the third receiving process to the service providing apparatus through the first communicator;

a fourth receiving process of receiving the first authentication information from the service providing apparatus through the first communicator, the first authentication information being issued in association with the second authentication information;

a first determining process of determining whether a data size of the first authentication information received by the fourth receiving process is larger than a threshold size;

a first issuing process of, in response to determining in the first determining process that the data size of the first authentication information is larger than the threshold size, issuing the first identification information that identifies the first authentication information;

a first storing process of storing, in the memory, the first authentication information received by the fourth receiving process and the first identification information issued by the first issuing process in association with each other; and a fourth transmitting process of transmitting first communication instructing information to the image forming apparatus through the first communicator, the first communication instructing information including the first identification information issued by the first issuing process, the first communication instructing information being information instructing transmission of the service requesting information and the first identification information to the relay apparatus; and wherein the apparatus memory further stores instructions, the instructions, when executed by the apparatus processor, causing the image forming apparatus to:

transmit the second authentication information to the relay apparatus through the apparatus communicator; and receive the first communication instructing information from the relay apparatus through the apparatus communicator.

17. The communication system according to claim 16, wherein the first memory further stores instructions, the instructions, when executed by the server processor, causing the relay apparatus to execute:

a fifth transmitting process of, in response to determining in the first determining process that the data size of the first authentication information is smaller than or equal to the threshold size, transmitting second communication instructing information to the image forming apparatus through the first communicator, the second communication instructing information including the first authentication information received by the fourth receiving process, the second communication instructing information being information instructing transmission of the service requesting information and the first authentication information to the service providing apparatus; and wherein the apparatus memory further stores instructions, the instructions, when executed by the apparatus processor, causing the image forming apparatus to:

receive the second communication instructing information from the relay apparatus through the apparatus communicator.

18. The communication system according to claim 16, wherein the first memory further stores instructions, the instructions, when executed by the processor, causing the relay apparatus to execute:
    a fifth receiving process of receiving size information from the image forming apparatus through the communicator, the size information being indicative of a maximum size of the first authentication information stored in the image forming apparatus; and
    wherein, in the first determining process, the threshold size is a size indicated by the size information received by the fifth receiving process; and
    wherein the apparatus memory further stores instructions, the instructions, when executed by the apparatus processor, causing the image forming apparatus to:
    transmit the size information to the relay apparatus through the apparatus communicator.

19. The communication system according to claim 16, wherein the first memory stores the second authentication information and temporary identification information associated with the second authentication information;
    wherein the first memory further stores instructions, the instructions, when executed by the server processor, causing the relay apparatus to execute:
        a sixth receiving process of receiving the temporary identification information from the image forming apparatus through the first communicator;
        a second read-out process of reading out, from the memory, the second authentication information associated with the temporary identification information received by the sixth receiving process;
        a second determining process of determining whether a data size of the second authentication information read out by the second read-out process is larger than a threshold size;
        a second issuing process of, in response to determining in the second determining process that the data size of the second authentication information is larger than the threshold size, issuing second identification information that identifies the second authentication information and that has a smaller data size than the second authentication information;
        a second storing process of storing, in the memory, the second authentication information read out in the second read-out process and the second identification information issued by the second issuing process in association with each other; and
        a sixth transmitting process of transmitting the second identification information issued by the second issuing process to the image forming apparatus through the first communicator; and
    wherein the apparatus memory further stores instructions, the instructions, when executed by the apparatus processor, causing the image forming apparatus to:
        transmit the temporary identification information to the relay apparatus through the apparatus communicator;
        receive the second identification information from the relay apparatus through the apparatus communicator; and
        store the second identification information in the apparatus memory.

20. The communication system according to claim 15, wherein the image forming apparatus has a reader configured to read an image recorded on an original document and to generate image data;
    wherein the service requesting information includes the image data generated by the reader as upload data, the service requesting information being information requesting a service of storing the upload data; and
    wherein the service information is information indicating that the upload data included in the service requesting information is stored.

\* \* \* \* \*